(12) United States Patent
Kim et al.

(10) Patent No.: US 12,349,063 B2
(45) Date of Patent: Jul. 1, 2025

(54) METHOD AND APPARATUS FOR REDUCING TERMINAL POWER CONSUMPTION IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Hoondong Noh, Gyeonggi-do (KR); Jeongho Yeo, Gyeonggi-do (KR); Jinkyu Kang, Gyeonggi-do (KR); Youngbum Kim, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 574 days.

(21) Appl. No.: 17/435,170

(22) PCT Filed: Jul. 17, 2020

(86) PCT No.: PCT/KR2020/009432
§ 371 (c)(1),
(2) Date: Aug. 31, 2021

(87) PCT Pub. No.: WO2021/015498
PCT Pub. Date: Jan. 28, 2021

(65) Prior Publication Data
US 2022/0150827 A1 May 12, 2022

(30) Foreign Application Priority Data
Jul. 19, 2019 (KR) .......................... 10-2019-0087914

(51) Int. Cl.
*H04W 52/02* (2009.01)
*H04W 72/23* (2023.01)

(52) U.S. Cl.
CPC ....... *H04W 52/0216* (2013.01); *H04W 72/23* (2023.01)

(58) Field of Classification Search
CPC ............. H04W 52/0216; H04W 72/23; H04W 72/20; H04W 4/70; H04W 52/0212;
(Continued)

(56) References Cited

U.S. PATENT DOCUMENTS 11,115,967 B2 * 9/2021 Cheng ................... H04L 1/0026
11,219,023 B2   1/2022 Yang et al.
(Continued)

FOREIGN PATENT DOCUMENTS

CN   109586881   4/2019
CN   109845178   6/2019
(Continued)

OTHER PUBLICATIONS

Apple Inc., "Cross Slot Scheduling for UE Power Saving", R1-1907346, 3GPP TSG RAN WG1 #97, May 13-17, 2019, 10 pages.
(Continued)

*Primary Examiner* — Thuong Nguyen
(74) *Attorney, Agent, or Firm* — The Farrell Law Firm, P.C.

(57) ABSTRACT

The present disclosure relates to a communication technique for convergence between IoT technology and a 5G communication system for supporting a higher data transmission rate beyond a 4G system, and a system therefor. The present disclosure may be applied to intelligent services (e.g. smart homes, smart buildings, smart cities, smart cars or connected cars, health care, digital education, retail businesses, security and safety-related services, etc.) on the basis of 5G communication technologies and IoT-related technologies. In addition, the present disclosure provides a method and an apparatus for reducing terminal power consumption in a
(Continued)

wireless communication system. A method of a terminal in a wireless communication system according to an embodiment of the present disclosure may comprise the steps of: receiving control information indicating a minimum offset related to the time interval between a control channel and a data channel scheduled by the control channel from a base station; identifying an application latency time related to subcarrier spacing of the control channel and a reception symbol position of the control information; and after the passage of the application latency time from a slot receiving the control information, transmitting or receiving the control channel and the data channel to or from the base station on the basis of the minimum offset.

8 Claims, 10 Drawing Sheets

(58) Field of Classification Search
CPC ............. H04W 72/0453; H04L 5/0064; H04L 5/0094; H04L 5/0053; H04L 5/0078; Y02D 30/70
USPC ......................................................... 370/311
See application file for complete search history.

(56) References Cited

U.S. PATENT DOCUMENTS

| | | | |
|---|---|---|---|
| 2017/0055234 A1* | 2/2017 | Seo | H04L 27/2675 |
| 2017/0086153 A1* | 3/2017 | Yoon | H04W 56/001 |
| 2019/0104543 A1 | 4/2019 | Park | |
| 2019/0150130 A1* | 5/2019 | Yang | H04W 24/08 |
| | | | 370/311 |
| 2019/0306855 A1* | 10/2019 | Tiirola | H04L 27/26025 |
| 2020/0008205 A1* | 1/2020 | Wang | H04W 72/23 |
| 2020/0022175 A1 | 1/2020 | Xiong et al. | |
| 2020/0053724 A1* | 2/2020 | MolavianJazi | H04W 52/367 |
| 2020/0068509 A1 | 2/2020 | Ahn et al. | |
| 2020/0146032 A1* | 5/2020 | Bae | H04L 1/1819 |
| 2020/0204293 A1 | 6/2020 | Kim et al. | |
| 2020/0267643 A1* | 8/2020 | Wu | H04L 5/0092 |
| 2020/0280404 A1* | 9/2020 | Qin | H04L 27/2613 |
| 2020/0296697 A1* | 9/2020 | Hwang | H04W 72/23 |
| 2021/0160911 A1* | 5/2021 | Park | H04L 5/0094 |
| 2021/0250887 A1* | 8/2021 | Xiong | H04W 48/20 |
| 2021/0351837 A1* | 11/2021 | Nader | H04B 7/0834 |
| 2021/0352629 A1* | 11/2021 | Haghighat | H04W 72/0446 |
| 2021/0352708 A1* | 11/2021 | Seo | H04W 52/0216 |
| 2022/0141065 A1* | 5/2022 | Mondal | H04L 5/005 |
| | | | 370/329 |
| 2022/0150827 A1* | 5/2022 | Kim | H04L 5/0064 |
| 2022/0150929 A1* | 5/2022 | Matsumura | H04L 5/0044 |
| 2023/0143073 A1* | 5/2023 | Li | H04L 5/1469 |
| | | | 370/329 |

FOREIGN PATENT DOCUMENTS

| | | |
|---|---|---|
| KR | 10-2020-0077895 | 7/2020 |
| WO | WO 2018/175820 | 9/2018 |
| WO | WO 2018/203678 | 11/2018 |
| WO | WO 2019/050379 | 3/2019 |
| WO | WO 2018-169937 | 6/2019 |

OTHER PUBLICATIONS

MediaTek Inc., "Summary of Cross-slot Scheduling Power-Saving Techniques", R1-190XXXX, 3GPP TSG RAN WG1 Meeting #97, May 13-17, 2019, 26 pages.
European Search Report dated Jan. 17, 2022 issued in counterpart application No. 20844357.2-1205, 9 pages.
Indian Examination Report dated Mar. 22, 2022 issued in counterpart application No. 202137037918, 6 pages.
PCT/ISA/210 Search Report issued on PCT/KR2020/009432, Oct. 6, 2020, pp. 6.
PCT/ISA/237 Written Opinion issued on PCT/KR2020/009432, Oct. 6, 2020, pp. 4.
Huawei, HiSilicon, 'Procedure of cross-slot scheduling for UE power saving', R1-1906006, 3GPP TSG RAN WG1 #97, Reno, USA, pp. 14.
LG Electronics, 'Discussion on cross-slot scheduling for power saving', R1-1906696, 3GPP TSG RAN WG1 Meeting #97, Reno, USA, pp. 7.
Chinese Office Action dated Oct. 20, 2023 issued in counterpart application No. 202080023592.2, 12 pages.
European Search Report dated Sep. 23, 2022 issued in counterpart application No. 20844357.2-1206, 7 pages.
OPPO, "Delay-Tolerant HARQ Operation for NTN", R1-1906386, 3GPP TSG RAN WG1 #97, May 13-17, 2019, 4 pages.
Chinese Office Action dated Jun. 6, 2024 Issued in counterpart application No. 202080023592.2, 7 pages.
Indian Notice of Hearing dated May 24, 2024 issued in counterpart application No. 202137037918, 2 pages.
ZTE Corporation, "Discussion on Cross-Carrier Scheduling with Different Numerologies", R1-1904154, 3GPP TSG RAN WG1 Meeting #96bis, Apr. 8-12, 2019, 8 pages.
European Search Report dated Jan. 30, 2025 issued in counterpart application No. 20844357.2-1206, 8 pages.

* cited by examiner

METHOD AND APPARATUS FOR REDUCING TERMINAL POWER CONSUMPTION IN WIRELESS COMMUNICATION SYSTEM

PRIORITY

This application is a National Phase Entry of PCT International Application No. PCT/KR2020/009432, which was filed on Jul. 17, 2020, and claims priority to Korean Patent Application No. 10-2019-0087914, which was filed on Jul. 19, 2019, the content of each of which is incorporated herein by reference.

TECHNICAL FIELD

The disclosure relates to a method and an apparatus for receiving terminal power consumption in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure". "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, various services can be provided, and accordingly there is a need for schemes to efficiently provide these services.

DETAILED DESCRIPTION OF INVENTION

Technical Problem

An embodiment of the disclosure provides an apparatus and a method for effectively providing a service in a mobile communication system.

Solution to Problem

A method of a terminal in a wireless communication system according to an embodiment of the disclosure in order to solve the above problem may include: receiving, from a base station, control information indicating a minimum offset related to a time interval between a control channel and a data channel scheduled by the control channel, identifying an application delay time interval related to subcarrier spacing of the control channel and a reception symbol position of the control information; and transmitting or receiving the control channel and the data channel to or from the base station according to the minimum offset after the application delay time interval from a slot in which the control information is received.

According to an embodiment, the application delay time interval is related to a sum of first information determined according to the subcarrier spacing of the control channel and second information determined according to the reception symbol position of the control information.

According to an embodiment, when the control information is received within first three symbols in a slot, the second information is 0, and when the control information is received outside of first three symbols in a slot, the second information is 1.

According to an embodiment, the control information may correspond to downlink control information (DCI) format 0_1 or DCI format 1_1.

In addition, a method of a base station in a wireless communication system according to an embodiment of the disclosure may include: transmitting, to a terminal, control information indicating a minimum offset related to a time interval between a control channel and a data channel scheduled by the control channel; and transmitting or receiving the control channel and the data channel to or from the terminal according to the minimum offset, wherein the minimum offset is applied after an application delay time interval from a slot in which control information is received by the terminal, and the application delay time interval is related to subcarrier spacing of the control channel and a reception symbol position of the control information of the terminal.

In addition, a terminal in a wireless communication system according to an embodiment of the disclosure may include: a transceiver; and a controller configured to: receive, from a base station, control information indicating a minimum offset related to a time interval between a control channel and a data channel scheduled by the control channel; identify an application delay time interval related to subcarrier spacing of the control channel and a reception symbol position of the control information; and transmit or receive the control channel and the data channel to or from the base station according to the minimum offset after the application delay time interval from a slot in which the control information is received.

In addition, a base station in a wireless communication system according to an embodiment may include: a transceiver; and a controller configured to: transmit, to a terminal, control information indicating a minimum offset related to a time interval between a control channel and a data channel scheduled by the control channel; and transmit or receive the control channel and the data channel to or from the terminal according to the minimum offset, wherein the minimum offset is applied after an application delay time interval from a slot in which control information is received by the terminal, and the application delay time interval is related to subcarrier spacing of the control channel and a reception symbol position of the control information of the terminal.

Advantageous Effects of Invention

An embodiment of the disclosure provides an apparatus and a method for effectively providing a service in a mobile communication system.

MODE FOR THE INVENTION

Figure 1:
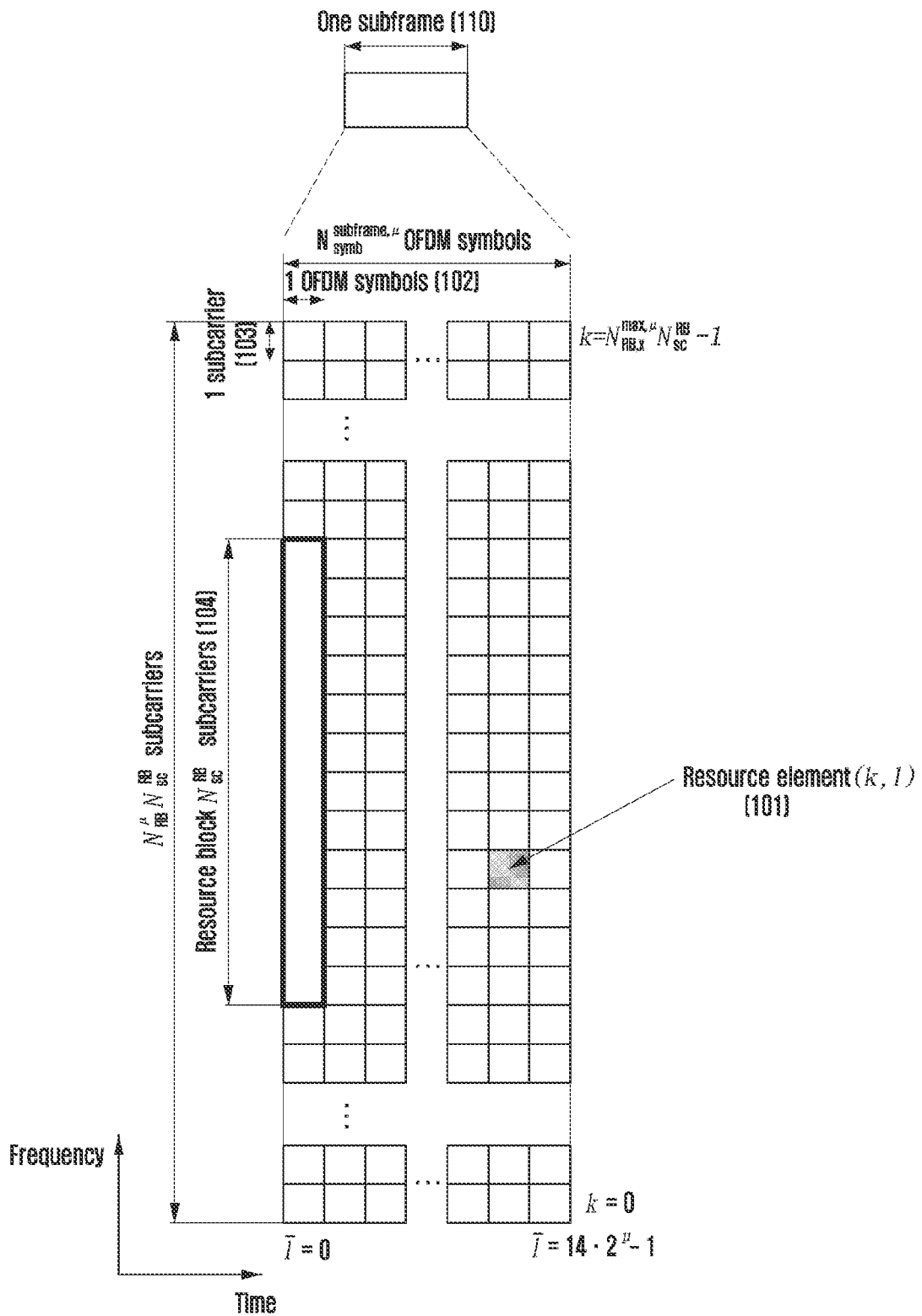
FIG. 1 illustrates a basic structure of a time-frequency area in the next-generation mobile communication system according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is an entity that assigns resources of a terminal, and may be at least one of a gNode B, an eNode B, a Node B, a base station (BS), a wireless access unit, a base station controller, or a node on a network. A terminal may include a user equipment (UE), a mobile station (MS), a cellular phone, a smartphone, a computer, or a multimedia system capable of performing a communication function. In the disclosure, a downlink (DL) means a radio transmission path of a signal transmitted from a base station to a terminal, and an uplink (UL) means a radio transmission path of a signal transmitted from a terminal to a base station. Furthermore, hereinafter, the LTE or LTE-A system is described as an example in the disclosure, but embodiments of the disclosure may be applied to other communication systems having a similar technical background or channel type. For example, a 5th-generation mobile communication technology (5G or new-radio (NR)) developed beyond LTE-A can be included therein. Furthermore, an embodiment of the disclosure may be applied to other communication systems through some modifications without greatly departing from the range of the disclosure according to a determination of those having skilled technical knowledge.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Wireless communication systems have expanded beyond the original role of providing a voice-oriented service and have evolved into wideband wireless communication systems that provide a high-speed and high-quality packet data service according to, for example, communication standards such as high-speed packet access (HSPA), long-term evolution (LTE or evolved universal terrestrial radio access (E-UTRA)), and LTE-Advanced (LTE-A) of 3GPP, high-rate packet data (HRPD) and a ultra-mobile broadband (UMB) of 3GPP2, and 802.16e of IEEE.

As a representative example of the broadband wireless communication systems, in an LTE system, an orthogonal frequency-division multiplexing (OFDM) scheme has been adopted for a downlink (DL), and both the OFDM scheme and a single carrier frequency division multiple access (SC-FDMA) scheme have been adopted for an uplink (UL). The uplink indicates a radio link through which data or a control signal is transmitted from a terminal (a user equipment (UE) or a mobile station (MS)) to a base station (an eNode B or a base station (BS)), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

A future communication system subsequent to the LTE, that is, a 5G communication system, has to be able to freely reflect various requirements from a user, a service provider, and the like, and thus service satisfying all of the various requirements needs to be supported. The services considered for the 5G communication system include enhanced mobile broadband (eMBB), massive machine-type communication (mMTC), ultra-reliable low-latency communication (URLLC), etc.

The eMBB aims to provide a data rate superior to the data rate supported by the existing LTE, LTE-A, or LTE-Pro. For example, in the 5G communication system, the eMBB should be able to provide a peak data rate of 20 Gbps in the downlink and a peak data rate of 10 Gbps in the uplink from the viewpoint of one base station. In addition, the 5G communication system should be able to provide not only the peak data rate but also an increased user-perceived terminal data rate. In order to satisfy such requirements, improvement of various transmitting and receiving technologies including a further improved multi-input multi-output (MIMO) transmission technology is required in the 5G communication system. In addition, a signal is transmitted using a transmission bandwidth of up to 20 MHz in the 2 GHz band used by the current LTE, but the 5G communication system uses a bandwidth wider than 20 MHz in the frequency band of 3 to 6 GHz or 6 GHz or higher, thereby satisfying the data rate required in the 5G communication system.

In addition, the mMTC is being considered to support application services such as the Internet of Things (IoT) in the 5G communication system. The mMTC may be required to support access by a large number of terminals in a cell, coverage enhancement of a terminal, improved battery time, and cost reduction of a terminal in order to efficiently provide the IoT. The IoT needs to be able to support a large number of terminals (for example, 1,000,000 terminals/$kM^2$) in a cell because it is attached to various sensors and devices to provide communication functions. Furthermore, a terminal supporting mMTC is more likely to be located in a shaded area that is not covered by a cell due to the nature of services, such as a basement of a building, and thus the terminal requires wider coverage than other services provided in the 5G communication system. The terminal supporting mMTC needs to be configured as an inexpensive terminal and may require a very long battery life time, such as 10 to 15 years, because it is difficult to frequently replace the battery of the terminal.

Finally, the URLLC is a cellular-based wireless communication service used for mission-critical purposes, and may be applied to services used for remote control for a robot or machinery, industrial automation, an unmanned aerial vehicle, remote health care, an emergency alert, or the like. Therefore, the communication provided by the URLLC may provide ultra-low latency and ultra-high reliability. For example, a service that supports the URLLC needs to satisfy air interface latency of less than 0.5 milliseconds, and may also have requirements of a packet error rate of $10^{-5}$ or lower. Therefore, for the service that supports the URLLC, the 5G system needs to provide a transmission time interval (TTI) smaller than those of other services, and design matters for allocating wide resources in the frequency band in order to secure reliability of the communication link may also arise.

The above-described three services considered in the 5G communication system, that is, the eMBB, the URLLC, and the mMTC, may be multiplexed and transmitted in a single system. Here, in order to satisfy the different requirements of each of the services, different transmission or reception schemes and different transmission and reception parameters may be used for the services. Services in the 5G communication system are not limited to the above-described three services.

Hereinafter, a frame structure in the 5G system will be described in detail with reference to accompanying drawings.

FIG. 1 illustrates a basic structure of a time-frequency area, which is a radio resource area in which a data or a control channel is transmitted in the next-generation mobile communication system according to an embodiment of the disclosure.

In FIG. 1, a horizontal axis indicates a time area, and a vertical axis indicates a frequency area. A basic unit of a resource in the time-frequency area is a resource element (RE) 101 and may be defined as one orthogonal frequency division multiplexing (OFDM) symbol 102 in the time axis and one subcarrier 103 in the frequency axis. In the frequency area, $N_{SC}^{RB}$ (for example, 12) consecutive REs may constitute one resource block (RB) 104.

Figure 2:
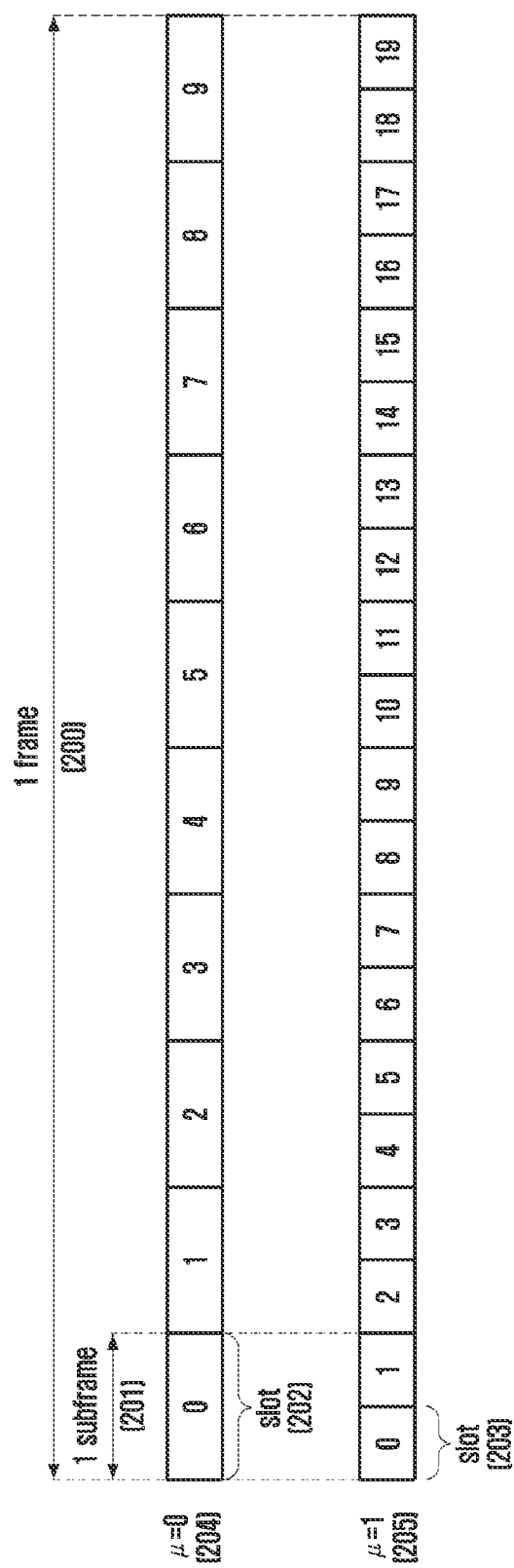
FIG. 2 illustrates structures of a frame, a subframe, and a slot in the next-generation mobile communication system according to an embodiment of the disclosure.

FIG. 2 illustrates structures of a frame, a subframe, and a slot in the next-generation mobile communication system according to an embodiment of the disclosure.

In FIG. 2, an example of the structures of a frame 200, a subframe 201, and a slot 202 or 203 is illustrated. One frame 200 may be defined as 10 ms. One subframe 201 may be defined as 1 ms, and accordingly, one frame 200 may include a total of 10 subframes 201. One slot 202 or 203 may be defined as 14 OFDM symbols (that is, the number of symbols per slot ($N_{symb}^{slot}$)=14). One subframe 201 may include one or a plurality of slots 202 and 203, and the numbers of slots 202 or 203 per subframe 201 may vary according to a configuration value μ 204 or 205 for subcarrier spacing. In the example of FIG. 2, a case of having a subcarrier spacing configuration value of μ=0 204 and a case of having a subcarrier spacing configuration value of μ=1 205 are illustrated. In the case of μ=0 204, one subframe 201 may include one slot 202, and, in the case of μ=1 205, one subframe 201 may include two slots 203. That is, the number of slots per subframe ($N_{slot}^{subframe,\mu}$) may vary according to the configuration value μ for subcarrier spacing, and accordingly, the number of slots per frame ($N_{slot}^{frame,\mu}$) may vary. $N_{slot}^{subframe,\mu}$ and $N_{slot}^{frame,\mu}$ according to each subcarrier spacing configuration value μ may be defined as shown in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 1-continued

| μ | $N_{symb}^{slot}$ | $N_{slot}^{frame,\mu}$ | $N_{slot}^{subframe,\mu}$ |
|---|---|---|---|
| 4 | 14 | 160 | 16 |
| 5 | 14 | 320 | 32 |

Next, a configuration of a bandwidth part (BWP) in the 5G communication system will be described in detail with the accompanying drawing.

Figure 3:
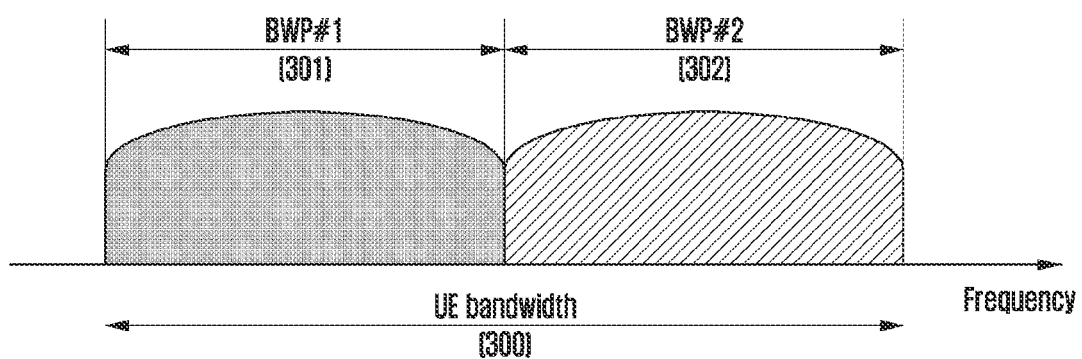
FIG. 3 illustrates an example of a configuration of a bandwidth part in the next-generation mobile communication system according to an embodiment of the disclosure.

FIG. 3 illustrates an example of a configuration of a bandwidth part in the next-generation mobile communication system according to an embodiment of the disclosure.

FIG. 3 shows an example in which a terminal bandwidth (UE bandwidth) 300 is configured as two bandwidth parts, that is, bandwidth part #1 301 and bandwidth part #2 302. A base station may configure one or a plurality of bandwidth parts for the terminal, and may configure the following information for each bandwidth part.

TABLE 2

```
BWP ::=      SEQUENCE {
  bwp-Id                      BWP-Id,
  (bandwidth part ID)
  locationAndBandwidth        INTEGER (1..65536),
  (bandwidth part location)
  subcarrierSpacing           ENUMERATED {n0, n1, n2, n3, nd, n5},
  (subcarrier spacing)
  cyclicPrefix                ENUMERATED { extended }
  (cyclic prefix)
}
```

Without being limited to the above example, not only the configuration information but also various parameters associated with the bandwidth part may be configured for the terminal. The information may be transmitted from the base station to the terminal through higher-layer signaling, for example, radio resource control (RRC) signaling. Among the one or a plurality of configured bandwidth parts, at least one bandwidth part may be activated. Information indicating whether the configured bandwidth parts are activated may be semi-statically transferred from the base station to the terminal through RRC signaling, or may be dynamically transferred through downlink control information (DCI).

According to some embodiments, the terminal before the RRC connection may receive the configuration of an initial bandwidth part (initial BWP) for initial access from the base station through a master information block (MIB). More specifically, the terminal may receive configuration information for a control resource set (CORESET) and a search space in which a PDCCH for receiving system information (remaining system information: RMSI or system information block 1: SIB1) required for initial access through the MIB can be transmitted in an initial access stage. Each of the control resource set and the search space configured as the MIB may be considered as identity (ID) 0. The base station may inform the terminal of configuration information such as frequency allocation information for control resource set #0, time allocation information, numerology, and the like, through the MIB. Furthermore, the base station may inform the terminal of configuration information for a monitoring period and occasion of control resource set #0, that is, configuration information for search space #0, through the MIB. The terminal may consider a frequency area configured as control resource set #0 acquired from the MIB as an initial bandwidth part for initial access. At this time, the ID of the initial bandwidth part may be considered as 0.

The configuration of the bandwidth part supported by 5G may be used for various purposes.

According to some embodiments, a case in which the bandwidth supported by the terminal is smaller than the system bandwidth may be supported through the configuration of the bandwidth part. For example, as the frequency location (configuration information 2) of the bandwidth part is configured for the terminal, the terminal may transmit or receive data at a specific frequency location within the system bandwidth.

In addition, according to some embodiments, the base station may configure a plurality of bandwidth parts in the terminal for the purpose of supporting different numerologies. For example, in order to support a terminal with data transmission and reception using both subcarrier spacing of 15 kHz and subcarrier spacing of 30 kHz, two bandwidth parts may be configured as subcarrier spacings of 15 kHz and 30 kHz, respectively. Different bandwidth parts may be frequency-division-multiplexed, and when data is transmitted or received at particular subcarrier spacing, the bandwidth part configured as the corresponding subcarrier spacing may be activated.

In addition, according to some embodiments, the base station may configure bandwidth parts having different size bandwidths for the terminal for the purpose of reducing the power consumption of the terminal. For example, when the terminal supports a very large bandwidth, for example, a bandwidth of 100 MHz, and always transmits or receives data through the corresponding bandwidth, very high power consumption may result. Particularly, monitoring an unnecessary downlink control channel through a large bandwidth of 100 MHz in the state in which there is no traffic may be very inefficient from the aspect of power consumption. In order to reduce power consumption of the terminal, the base station may configure, for the terminal, a bandwidth part having a relatively narrower bandwidth, for example, a bandwidth part of 20 MHz. The terminal may perform a monitoring operation in the bandwidth part of 20 MHz in the state in which there is no traffic, and when data is generated, the terminal may transmit or receive data through the bandwidth part of 100 MHz according to an instruction from the base station.

In a method of configuring the bandwidth part, terminals before the RRC connection may receive configuration information for an initial bandwidth part through a master information block (MIB) in an initial access stage. More specifically, the terminal may receive the configuration of a control resource set (CORESET) for a downlink control channel in which downlink control information (DCI) for scheduling a system information block (SIB) can be transmitted from an MIB of a physical broadcast channel (PBCH). The bandwidth of the control resource set configured as the MIB may be considered as an initial bandwidth part, and the terminal may receive a physical downlink shared channel (PDSCH) in which the SIB is transmitted, through the configured initial bandwidth part. The initial bandwidth part may be used not only for receiving the SIB but also for other system information (OSI), paging, or random access.

When there are one or more bandwidth parts configured for the terminal, the base station may indicate the switch of the bandwidth part by using a bandwidth part indicator field in the DCI. For example, in FIG. 3, when the currently activated bandwidth part of the terminal is bandwidth part #1 301, the base station may indicate, to the terminal, bandwidth part #2 302 as a bandwidth part indicator in the DCI, and the terminal may switch the bandwidth part to bandwidth part #2 302 which is indicated as the bandwidth part indicator in the received DCI.

The above-described switch to the bandwidth part based on the DCI may be indicated by the DCI for scheduling the PDSCH or the PUSCH, and thus, when the terminal receives a request for a bandwidth part switch, reception or transmission of the PDSCH or the PUSCH scheduled by the corresponding DCI may be smoothly performed in the switched bandwidth part. To this end, in the standard, the requirements for a delay time interval (TBWP) required at the time of the bandwidth part switch are regulated, and may be defined below, for example.

| μ | NR Slot length (ms) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.

Note 2:
If the BWP switch involves changing of SCS, the BWP switch delay is determined by the larger one between the SCS before BWP switch and the SCS after BWP switch.

The requirements for a bandwidth part switch delay time interval support type 1 or type 2 according to the terminal capability. The terminal may report a supportable bandwidth part switch delay type to the base station.

According to the above requirements for the bandwidth part switch delay time interval, when the terminal receives DCI including the bandwidth part switch indicator in slot n, the terminal may complete the switch to a new bandwidth part indicated by the bandwidth part switch indicator at a time point no later than slot n+$T_{BWP}$, and may perform transmission or reception for the data channel scheduled by the corresponding DCI in the switched new bandwidth part. When the base station is to schedule a data channel in a new bandwidth part, the base station may determine time domain resource allocation for the data channel by considering the bandwidth part switch delay time interval ($T_{BWP}$) of the terminal. That is, in a method for determining time domain resource allocation for a data channel when the base station schedules the data channel in a new bandwidth part, scheduling for the corresponding data channel may be performed after a bandwidth part switch delay time interval. Accordingly, the terminal may not expect that DCI indicating the bandwidth part switch indicates a value of a slot offset (K0 or K2) smaller than the value of the bandwidth part switch delay time interval ($T_{BWP}$).

When the terminal receives the DCI (for example, DCI format 1_1 or 0_1) indicating the bandwidth part switch, the terminal may not perform any transmission or reception during a time interval from the third symbol of the slot in which the PDCCH including the corresponding DCI is included to a starting point of a slot indicated with a slot offset (K0 or K2) value indicated by a time domain resource allocation indicator field in the corresponding DCI. For example, when the terminal receives DCI indicating the bandwidth part switch in slot n, and the slot offset value indicated by the corresponding DCI is K, the terminal may not perform any transmission or reception from the third symbol of slot n to a symbol before slot n+K (i.e., the last symbol in the slot n+K−1).

Next, a synchronization signal (SS)/physical broadcast channel (PBCH) block in 5G will be described.

An SS/PBCH block may refer to a physical layer channel block including a primary SS (PSS), a secondary SS (SSS), and a PBCH, which are defined as follows:

PSS: A PSS is a reference signal for downlink time/frequency synchronization, which provides partial information of a cell ID.

SSS: An SSS is a reference signal for downlink time/frequency synchronization, which provides the rest of the cell ID information not provided by the PSS. The SSS may also serve as another reference signal for demodulation of the PBCH.

PBCH: A PBCH is a channel for providing essential system information required for transmission or reception of data channel and control channel for UE. The essential system information may include search-space-related control information indicating radio resource mapping information of the control channel, scheduling control information for an extra data channel that transmits system information, and the like.

SS/PBCH block: An SS/PBCH block is a combination of a PSS, an SSS, and a PBCH. One or more SS/PBCH blocks may be transmitted in 5 ms, and each SS/PBCH block may be distinguished by an index.

The terminal may detect the PSS and the SSS in the initial access process, and decode the PBCH. The terminal may obtain the MIB from the PBCH and may be configured with control resource set (CORESET) #0 (this may correspond to a control resource set having a control resource set index of 0) accordingly. The terminal may monitor control resource set #0, assuming that demodulation reference signal (DMRS) transmitted in control resource set #0 are quasi-co-located (QCL) with the selected SS/PBCH block. The terminal may receive system information as downlink control information transmitted in control resource set #0. The terminal may obtain random-access channel (RACH)-related configuration information required for initial access from the received system information. The terminal may transmit a physical RACH (PRACH) to the base station in consideration of the selected SS/PBCH index, and the base station having received the PRACH may obtain information on the SS/PBCH block index selected by the terminal. The base station may identify a block that the terminal selected from among respective SS/PBCH blocks and may identify that control resource set #0 associated with the selected block is monitored.

Next, downlink control information (DCI) in the 5G system will be described in detail.

In the 5G system, scheduling information for uplink data (or a physical uplink shared channel (PUSCH)) or downlink data (or a physical downlink shared channel (PDSCH)) is transmitted from the base station to the terminal via DCI. The terminal may monitor a fallback DCI format and a non-fallback DCI format for the PUSCH or the PDSCH. The fallback DCI format may include a fixed field predefined between the base station and the terminal, and the non-fallback DCI format may include a configurable field.

The DCI may be transmitted via a physical downlink control channel (PDCCH) after going through channel coding and modulation processes. Cyclic redundancy check (CRC) may be attached to a DCI message payload, and the CRC may be scrambled by a radio network temporary identifier (RNTI) that corresponds to the identity of the terminal. Depending on the use of the DCI message, for example, UE-specific data transmission, power control command, random-access response, or the like, different RNTIs may be used. In other words, the RNTI is transmitted not explicitly but included in a CRC calculation process and transmitted. When a DCI message transmitted on the PDCCH is received, the terminal may check CRC by using an allocated RNTI, and determine that the corresponding message is transmitted to the terminal when the CRC check result is correct.

For example, DCI that schedules a PDSCH for system information (SI) may be scrambled by an SI-RNTI. DCI that schedules a PDSCH for a random-access response (RAR) message may be scrambled by an RA-RNTI. DCI that schedules a PDSCH for a paging message may be scrambled by a P-RNTI. DCI that notifies of a slot format indicator (SFI) may be scrambled by an SFI-RNTI. DCI that notifies of a transmit power control (TPC) may be scrambled by a TPC-RNTI. DCI that schedules a UE-specific PDSCH or PUSCH may be scrambled by a cell RNTI (C-RNTI).

DCI format 0_0 may be used for the fallback DCI that schedules the PUSCH, and in this case, the CRC may be scrambled by the C-RNTI. DCI format 0_0 having a CRC scrambled by the C-RNTI may include, for example, information below.

TABLE 3

Identifier for DCI formats - [1] bit
Frequency domain resource assignment - 
[[log$_2$(N$_{RB}^{UL, BWP}$(N$_{RB}^{UL, BWP}$ + 1)/2)]] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
Uplink(UL)/supplementary UL (SUL) indicator - 0 or 1 bit DCI format 0_1 may be used for the non-fallback DCI that schedules the PUSCH, and in this case, the CRC may be scrambled by the C-RNTI. DCI format 0_1 having a CRC scrambled by the C-RNTI may include, for example, information below.

TABLE 4

Carrier indicator - 0 or 3 bits
UL/SUL indicator - 0 or 1 bit
Identifier for DCI formats - [1] bits
Bandwidth part indicator - 0, 1, or 2 bits
Frequency domain resource assignment
    For resource allocation type 0, ⌈N$_{RB}^{UL,BWP}$/P⌉ bits
    For resource allocation type 1,
    ⌈log$_2$(N$_{RB}^{UL,BWP}$(N$_{RB}^{UL,BWP}$ + 1)/2⌉ bits
Time domain resource assignment - 1, 2, 3, or 4 bits
virtual resource block (VRB)-to-physical resource block (PRB)
mapping - 0 or 1 bit, only for resource allocation type 1.
    0 bits if only resource allocation type 0 is configured;
    1 bit otherwise.
Frequency hopping flag - 0 or 1 bit, only for resource allocation type 1.
    0 bits if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-
    ACK codebook.
2nd downlink assignment index - 0 or 2 bits
    2 bits for dynamic HARQ-ACK codebook with two HARQ-
    ACK sub-codebooks;
    0 bits otherwise.

TABLE 4-continued

TPC command for scheduled PUSCH - 2 bits

SRS resource indicator - $\left\lceil \log_2\left(\sum_{k=1}^{L_{max}} \binom{N_{SRS}}{k}\right)\right\rceil$ or $\lceil \log_2(N_{SRS}) \rceil$ bits $\left\lceil \log_2\left(\sum_{k=1}^{L_{max}} \binom{N_{SRS}}{k}\right)\right\rceil$ bits for non-codebook based PUSCH transmission (if PUSCH transmission is not based on codebook);
$\lceil \log_2(N_{SRS}) \rceil$ bits for codebook based PUSCH transmission (if
PUSCH transmission is based on codebook).
Precoding information and number of layers - up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS) - demodulation reference signal
(DMRS) association - 0 or 2 bits.
beta_offset indicator - 0 or 2 bits
DMRS sequence initialization - 0 or 1 bit DCI format 1_0 may be used for the fallback DCI that schedules the PDSCH, and in this case, the CRC may be scrambled by the C-RNTI. DCI format 1_0 having a CRC scrambled by the C-RNTI may include, for example, information below.

TABLE 5

Identifier for DCI formats - [1] bit
Frequency domain resource assignment - 
$[\lceil \log_2(N_{RB}^{DL,\,BWP}(N_{RB}^{DL,\,BWP} + 1)/2)\rceil]$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits DCI format 1_1 may be used for the non-fallback DCI that schedules the PDSCH, and in this case, the CRC may be scrambled by the C-RNTI. DCI format 1_1 having CRC scrambled by the C-RNTI may include, for example, information below.

TABLE 6

Carrier indicator - 0 or 3 bits
Identifier for DCI formats - [1] bits
Bandwidth part indicator - 0, 1, or 2 bits
Frequency domain resource assignment
For resource allocation type 0, $\lceil N_{RB}^{DL,\,BWP}/P \rceil$ bits
For resource allocation type 1, TABLE 6-continued $\lceil \log_2(N_{RB}^{DL,\,BWP}(N_{RB}^{DL,\,BWP} + 1)/2) \rceil$ bits
Time domain resource assignment - 1, 2, 3, or 4 bits
VRB-to-PRB mapping - 0 or 1 bit, only for resource allocation type 1.
0 bits if only resource allocation type 0 is configured;
1 bit otherwise.
PRB bundling size indicator - 0 or 1 bit
Rate matching indicator - 0, 1, or 2 bits
Zero power channel state information-reference signal (ZP CSI-RS)
trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5, or 6 bits
Transmission configuration indication - 0 or 3 bits
SRS request - 2 bits
CBG transmission information - 0, 2, 4, 6, or 8 bits
CBG flushing out information (wherein CBG indicates code block
group) - 0 or 1 bit
DMRS sequence initialization - 1 bit Hereinafter, a time domain resource allocation method for a data channel in the 5G communication system will be described.

The base station may configure the terminal with a table of time domain resource allocation information for a downlink data channel (a physical downlink shared channel (PDSCH)) and an uplink data channel (a physical uplink shared channel (PUSCH)) by higher-layer signaling (for example, RRC signaling). For the PDSCH, a table including up to 16 (maxNrofDL-Allocations=16) entries may be configured, and for the PUSCH, a table including up to 16 (maxNrofUL-Allocations=16) entries may be configured. The time domain resource allocation information may include a PDCCH-to-PDSCH slot timing (corresponding to a time interval in units of slots between a time point at which a PDCCH is received and a time point at which a PDSCH scheduled by the received PDCCH is received, and denoted as "K0"), a PDCCH-to-PUSCH slot timing (corresponding to a time interval in units of slots between a time point at which a PDCCH is received and a time point at which a PUSCH scheduled by the received PDCCH is transmitted, and denoted as "K2"), information relating to the position and the length of a start symbol in the slot, in which the PDSCH or the PUSCH is scheduled, a mapping type of the PDSCH or the PUSCH, etc. For example, information as in Table 7 and Table 8 below may be notified from the base station to the terminal.

TABLE 7

PDSCH-TimeDomainResourceAllocationList information element

PDSCH-TimeDomainResourceAllocationList ::= SEQUENCE (SIZE(1 ..maxNrofDL-
Allocations)) OF PDSCH-TimeDomainResourceAllocation
PDSCH-TimeDomainResourceAllocation ::= SEQUENCE {
  k0 INTEGER(0..32)
OPTIONAL, -- Need S
  (PDCCH-to-PDSCH Timing, in units of slots)
    mappingType ENUMERATED {typeA, typeB},
  (PDSCH Mapping type)
    startSymbolAndLength INTEGER (0..127)
    (PDSCH Start Symbol and Length)
}

TABLE 8

PUSCH-TimeDomainResourceAllocation information element

PUSCH-TimeDomainResourceAllocationList ::= SEQUENCE (SIZE(1..maxNrofUL-
Allocations)) OF PUSCH-TimeDomainResourceAllocation
PUSCH-TimeDomainResourceAllocation ::= SEQUENCE {
  k2 INTEGER(0..32)
OPTIONAL, -- Need S
  (PDCCH-to-PUSCH Timing, in units of slots)
  mappingType ENUMERATED {typeA, typeB},
  (PUSCH Mapping Type)
  startSymbolAndLength INTEGER (0.. 127)
  (PUSCH Start Symbol and Length)
}

The base station may notify the terminal of one of the entries in the table relating to the time domain resource allocation information via L1 signaling (e.g., via the DCI, e.g., by using a "time domain resource allocation" field in the DCI). The terminal may obtain the time domain resource allocation information for the PDSCH or the PUSCH by using the DCI received from the base station.

A downlink control channel in the 5G communication system will be described in detail with reference to accompanying drawings.

Figure 4:
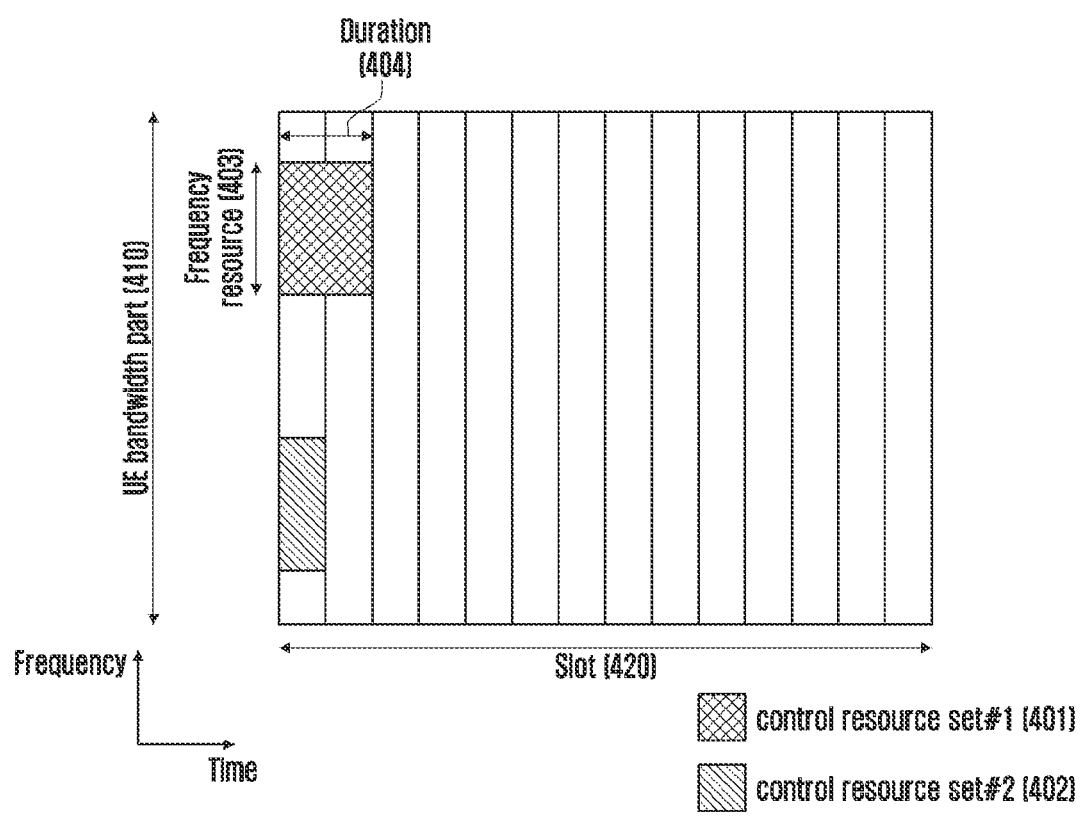
FIG. 4 illustrates an example of a control resource set (CORESET) of a downlink control channel in the next-generation wireless communication system according to an embodiment of the disclosure.

FIG. 4 illustrates an example of a control resource set (CORESET) in which a downlink control channel is transmitted in the next-generation wireless communication system according to an embodiment of the disclosure.

FIG. 4 shows an example in which a terminal bandwidth part (UE BWP) 410 is configured on the frequency axis, and two control resource sets (control resource set #1 401 and control resource set #2 402) are configured on the time axis in a slot 420. The control resource sets 401 and 402 may be configured in a particular frequency resource 403 in the entire UE BWP 410 on the frequency axis. One or more OFDM symbols may be configured on the time axis, and defined as a control resource set duration 404. Referring to the example of FIG. 4, control resource set #1 401 is configured to have the control resource set duration of two symbols, and control resource set #2 402 is configured to have the control resource set duration of one symbol.

The above-described control resource set in the 5G system may be configured by the base station for the terminal via higher-layer signaling (for example, via system information, a master information block (MIB), or RRC signaling). Configuring the terminal with the control resource set refers to providing the terminal with information such as a control resource set identity, the frequency position of the control resource set, and the symbol length of the control resource set. For example, the information may include information below.

TABLE 9

ControlResourceSet ::= SEQUENCE {
  -- Corresponds to L1 parameter 'CORESET-ID'
  controlResourceSetId ControlResourceSetId,
  (Control Resource Set Identity)
  frequencyDomainResources BIT STRING (SIZE (45)),
  (Frequency Domain Resource Allocation Information)
  duration INTEGER (1..maxCoReSetDuration),
  (Time Domain Resource Allocation Information)
  cce-REG-MappingType CHOICE {
  (CCE-to-REG Mapping Type)
    interleaved SEQUENCE{
      reg-BundleSize ENUMERATED {n2, n3, n6}.
      (REG Bundle Size)
      precoderGranularity ENUMERATED {sameAsREG-bundle, TABLE 9-continued

```
   allContiguousRBs},
     interleaverSize            ENUMERATED {n2, n3, n6}
       (Interleaver Size)
     shiftIndex                 INTEGER(0..maxNrofPhysicalResourceBlocks–
1) OPTIONAL
       (Interleaver Shift))
   },
   nonInterleaved               NULL
 },
 tci-StatesPDCCH                SEQUENCE(SIZE     (1..maxNrofTCI-
StatesPDCCH)) OF TCI-StateId   OPTIONAL,
   (QCL Configuration Information)
 tci-PresentInDCI               ENUMERATED {enabled}
       OPTIONAL,                  -- Need S
}
```

In Table 9, tci-StatesPDCCH (simply called a transmission configuration indication (TCI) state) configuration information may include information on one or more channel state information reference signal (CSI-RS) indices or synchronization signal (SS)/physical broadcast channel (PBCH) block indices having the QCL relation with the DMRS transmitted in the corresponding control resource set.

Figure 5:
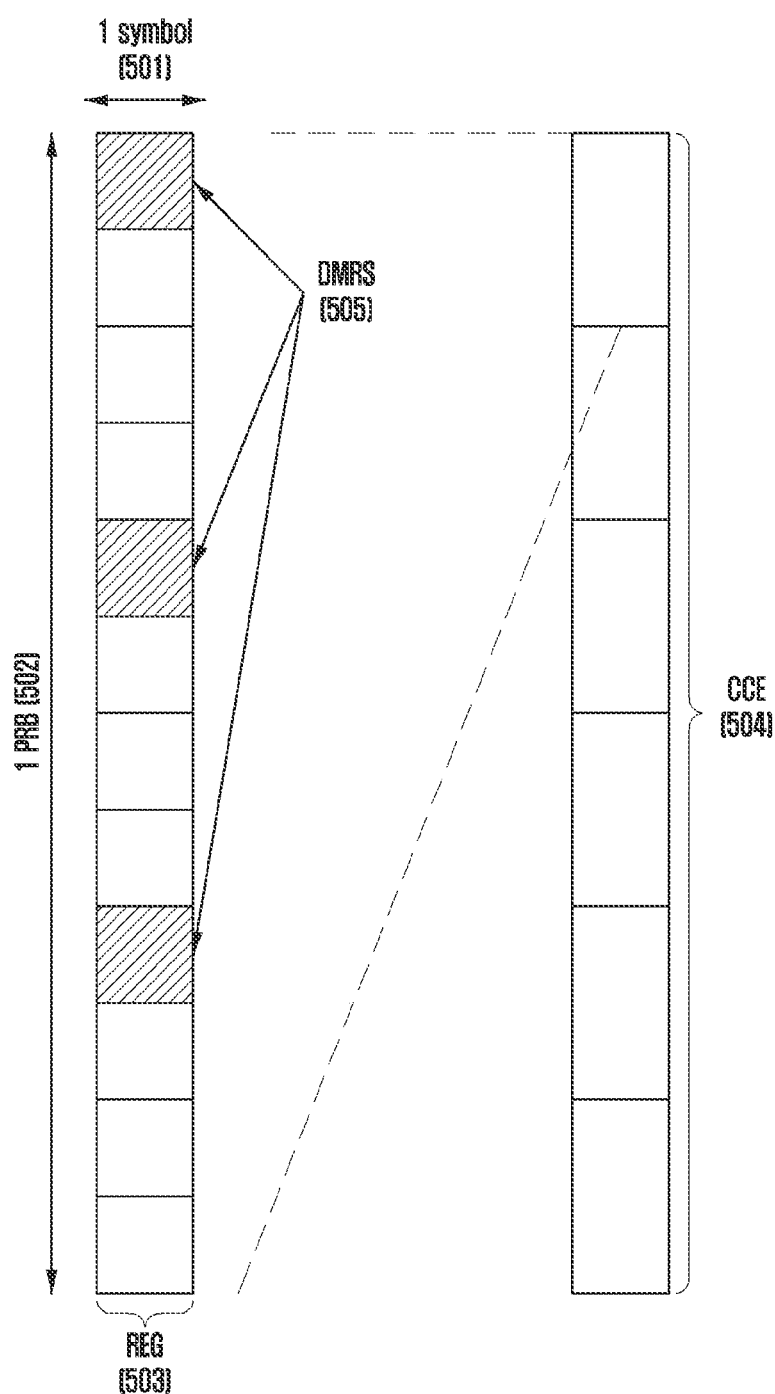
FIG. 5 illustrates a basic unit of a downlink control channel in the next-generation mobile communication system according to an embodiment of the disclosure.

FIG. 5 shows an example of a basic unit of time and frequency resources constituting a downlink control channel which can be used in the next-generation mobile communication system according to an embodiment of the disclosure.

Referring to FIG. 5, a basic unit of time and frequency resources constituting a control channel is referred to as a resource element group (REG) 503. The REG 503 may be defined by one OFDM symbol 501 on the time axis and one physical resource block (PRB) 502, i.e., 12 subcarriers, on the frequency axis. The base station may configure a downlink control channel allocation unit by being concatenated with the REG 503.

As shown in FIG. 5, in the 5G system, when a downlink control channel allocation unit is a control channel element (CCE) 504, one CCE 504 may include multiple REGs 503. For example, as shown in FIG. 5, the REG 503 may include 12 REs, and when one CCE 504 includes six REGs 503, the one CCE 504 may include 72 REs. When the downlink control resource set is configured, the corresponding control resource set may include multiple CCEs 504, and a particular downlink control channel may be transmitted by being mapped to one or more CCEs 504 according to an aggregation level (AL) in the control resource set. The CCEs 504 in the control resource set may be distinguished by numbers, and in this case, numbers may be allocated to the CCEs 504 according to a logical mapping scheme.

The basic unit of the downlink control channel shown in FIG. 5, i.e., the REG 503, may include both REs to which DCI is mapped and an area to which a DMRS 505 corresponding to a reference signal is mapped. As shown in FIG. 5, three DMRSs 505 may be transmitted in one REG 503. The number of CCEs required to transmit the PDCCH may be 1, 2, 4, 8, or 16 depending on the aggregation level (AL), and different numbers of CCEs may be used to implement link adaptation of the downlink control channel. For example, when AL=L, a single downlink control channel may be transmitted through L CCEs. The terminal needs to detect a signal without knowing information on the downlink control channel, and a search space representing a set of CCEs is defined for blind decoding. The search space is a set of downlink control channel candidates that include CCEs on which the terminal needs to try decoding at a given AL, and the terminal may have multiple search spaces since there are various ALs each making a bundle with 1, 2, 4, 8, or 16 CCEs. A search space set may be defined as a set of search spaces at all the configured ALs.

The search spaces may be classified into a common search space and a terminal-specific (UE-specific) search space. A certain group of terminals or all the terminals may check into a common search space of the PDCCH to dynamically schedule system information or receive cell-common control information such as a paging message. For example, PDSCH scheduling allocation information for transmitting an SIB including cell operator information or the like may be received by checking into the common search space of the PDCCH. For the common search space, a certain group of terminals or all the terminals need to receive the PDCCH, and thus the common search space may be defined as a set of pre-appointed CCEs. UE-specific PDSCH or PUSCH scheduling allocation information may be received by checking into the UE-specific search space of the PDCCH. The UE-specific search space may be UE-specifically defined as a function of various system parameters and the identity of the terminal.

In the 5G system, a parameter of the search space of the PDCCH may be configured by the base station for the terminal via higher-layer signaling (e.g., the SIB, the MIB, or RRC signaling). For example, the base station may configure the number of PDCCH candidates at each AL L, monitoring periodicity for the search space, monitoring occasion in units of symbols in the slot for the search space, a type of the search space (a common search space or a UE-specific search space), a combination of a DCI format to be monitored in the search space and an RNTI, control resource set index to monitor the search space, etc., for the terminal. For example, the configuration information may include information below.

TABLE 10

```
SearchSpace ::=                        SEQUENCE {
  -- Identity of the search space. SearchSpaceId = 0 identifies the SearchSpace configured via
PBCH (MIB) or ServingCellConfigCommon.
  searchSpaceId                        SearchSpaceId,
    (Search Space Identity)
```

TABLE 10-continued

```
controlResourceSetId                    ControlResourceSetId,
(Control Resource Set Identity)
monitoringSlotPeriodicityAndOffset      CHOICE {
(Monitoring Slot Level Periodicity)
    sl1                                 NULL,
    sl2                                 INTEGER (0..1),
    sl4                                 INTEGER (0..3),
    sl5                                 INTEGER (0..4),
    sl8                                 INTEGER (0..7),
    sl10                                INTEGER (0..9),
    sl16                                INTEGER (0..15),
    sl20                                INTEGER (0..19)
}
    OPTIONAL,
duration(Monitoring Duration)           INTEGER (2..2559)
monitoringSymbolsWithinSlot             BIT STRING (SIZE (14))
                                        OPTIONAL,
(Motoring symbol in Slot)
nrofCandidates                          SEQUENCE {
(Number of PDCCH Candidates for each Aggregation Level)
    aggregationLevel1                   ENUMERATED {n0, n1, n2, n3, n4, n5, n6, n8},
    aggregationLevel2                   ENUMERATED {n0, n1, n2, n3, n4, n5, n6, n8},
    aggregationLevel4                   ENUMERATED {n0, n1, n2, n3, n4, n5, n6, 118},
    aggregationLevel8                   ENUMERATED {n0, n1, n2, n3, n4, n5, n6, n8},
    aggregationLevel16                  ENUMERATED {n0, n1, n2, n3, n4, n5, n6, n8}
},
searchSpaceType                         CHOICE {
(Search Space Type)
    -- Configures this search space as common search space (CSS) and DCI formats to monitor.
    common                              SEQUENCE{
    (Common Search Space)
    }
    ue-Specific                         SEQUENCE {
    (UE-specific Search Space)
        -- Indicates whether the UE monitors in this USS for DCI formats 0-0 and 1-0 or for formats 0-1 and 1-1.
        formats                         ENUMERATED  {formats0-0-And-1-0, formats0-1-And-1-1},
        ...
    }
```

According to the configuration information, the base station may configure the terminal with one or more search space sets. According to some embodiments, the base station may configure the terminal with search space set 1 and search space set 2, wherein the terminal may be configured to monitor DCI format A scrambled by an X-RNTI in the search space set 1 in the common search space and monitor DCI format B scrambled by a Y-RNTI in the search space set 2 in the UE-specific search space.

The configuration information may indicate that there is one or more search space sets in the common or UE-specific search space. For example, search space set #1 and search space set #2 may be configured as the common search space, and search space set #3 and search space set #4 may be set as the UE-specific search space.

In the common search space, the following combinations of DCI formats and RNTIs may be monitored, and are not limited to the following example.

DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI In the UE-specific search space, the following combinations of DCI formats and RNTIs may be monitored, and are not limited to the following example.

DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The enumerated RNTIs may follow the following definitions and uses.

Cell RNTI (C-RNTI): used for UE-specific PDSCH scheduling

Temporary Cell RNTI (TC-RNTI): used for UE-specific PDSCH scheduling

Configured Scheduling RNTI (CS-RNTI): used for semi-statically configured UE-specific PDSCH scheduling Random Access RNTI (RA-RNTI): used for PDSCH scheduling in a random-access process Paging RNTI (P-RNTI): used for scheduling PDSCH on which paging is transmitted System Information RNTI (SI-RNTI): used for scheduling PDSCH on which system information is transmitted Interruption RNTI (INT-RNTI): used for indicating whether to puncture PDSCH Transmit Power Control for PUSCH RNTI (TPC-PUSCH-RNTI): used for indicating power control indication for PUSCH Transmit Power Control for PUCCH RNTI (TPC-PUCCH-RNTI): used for indicating power control indication for PUCCH Transmit Power Control for SRS RNTI (TPC-SRS-RNTI): used for indicating power control indication for SRS The above-described DCI formats may follow to the definitions below.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, in control resource set p and search space set s, a search space at AL L may be expressed as in the following equation.

$$L * \left\{ \left( Y_{p,n_{sf}^{\mu}} + \left\lfloor \frac{m_{s,n_{CI}} * N_{CCE,p}}{L * M_{p,s,max}^{(l)}} \right\rfloor + n_{CI} \right) \mod \lfloor N_{CCE,p} / L \rfloor \right\} + i \quad \text{[Equation 1]}$$

L: aggregation level $n_{CI}$: carrier index $N_{CCE,p}$: the total number of CCEs existing in control resource set p $n_{\mu,sf}$: slot index $M^{(L)}_{p,s,max}$: the number of PDCCH candidates of aggregation level L $m_{s,n_{CI}} = 0, \ldots, M^{(L)}_{p,s,max} - 1$: the indices of PDCCH candidates of aggregation level L $i = 0, \ldots, L-1$ $Y_{p,n_{sf}^{\mu}} = (A_p * Y_{p,n_{sf}^{\mu}-1}) \mod D$, $Y_{p,-1} = n_{RNTI} \neq 0$, $A_0 = 39827$, $A_1 = 39829$, $A_2 = 39839$, $D = 65537$ $n_{RNTI}$: terminal identifier In a case of a common search space, a value of $Y\_(p, n^{\mu}_{s,f})$ may correspond to 0.

In a case of a UE-specific search space, a value of $Y\_(p, n^{\mu}_{s,f})$ may correspond to a value that changes according to a terminal identity (a C-RNTI or an ID configured by the base station for the terminal) and a time index.

As multiple search space sets can be configured with different parameters (e.g., the parameters in Table 10) in the 5G system, a search space set monitored by the terminal may change each time. For example, when search space set #1 is configured with X-slot periodicity, search space set #2 is configured with Y-slot periodicity, and X and Y are different, the terminal may monitor both search space set #1 and search space set #2 in a particular slot, and monitor one of search space set #1 and search space set #2 in another particular slot.

When multiple search space sets are configured for the terminal, the following conditions may be considered in a method for determining a search space set to be monitored by the terminal.

[Condition 1: Restriction on the Maximum Number of PDCCH Candidates]

The number of PDCCH candidates to be monitored for each slot does not exceed $M^{\mu}$. $M^{\mu}$ may be defined as the maximum number of PDCCH candidates for each slot on a cell configured with $15 \cdot 2^{\mu}$ kHz subcarrier spacing, as shown in the Table 12 below.

TABLE 12

| μ | Maximum number of PDCCH candidates per slot and per serving cell ($M^{\mu}$) |
|---|---|
| 0 | 44 |
| 1 | 36 |
| 2 | 22 |
| 3 | 20 |

[Condition 2: Restriction on the Maximum Number of CCEs]

The number of CCEs constituting the entire search space (the entire search space herein refers to an entire CCE set corresponding to a union area of multiple search space sets) for each slot does not exceed $C^{\mu}$. $C^{\mu}$ may be defined as the maximum number of CCEs for each slot on a cell configured with $15 \cdot 2^{\mu}$ kHz subcarrier spacing, as shown in the following Table 13.

TABLE 13

| μ | Maximum number of CCEs per slot and per serving cell ($C^{\mu}$) |
|---|---|
| 0 | 56 |
| 1 | 56 |
| 2 | 48 |
| 3 | 32 |

For convenience of description, a situation that satisfies both conditions 1 and 2 at a particular time point is defined to be "condition A". Accordingly, failing to satisfy condition A may mean that at least one of conditions 1 or 2 is not satisfied.

Depending on the configuration of the search space sets of the base station, there may be an occasion when condition A is not satisfied at a particular time point. When condition A is not satisfied at the particular time point, the terminal may select and monitor some of the search space sets, which are configured to satisfy condition A at the corresponding time point, and the base station may transmit a PDCCH in the selected search space set.

Selecting some of the entire search space sets may be performed in the following methods.

Method 1

When condition A for the PDCCH fails to be satisfied in a particular time point (slot), The terminal may select a search space set having the search space type configured as the common search space over a search space set configured for the UE-specific search space, from among the search space sets that exist at the corresponding time point.

When all the search space sets configured as the common search space are selected (i.e., when condition A is satisfied although all the search spaces configured as the common search space are selected), the terminal (or the base station) may select search space sets configured as the UE-specific space. In this case, when there are multiple search space sets configured as the UE-specific search space, a search space set with a lower search space index may have a higher priority. Considering the priorities, the terminal or the base station may select UE-specific search space sets within a range in which the UE-specific search space sets satisfy condition A.

Figure 6:
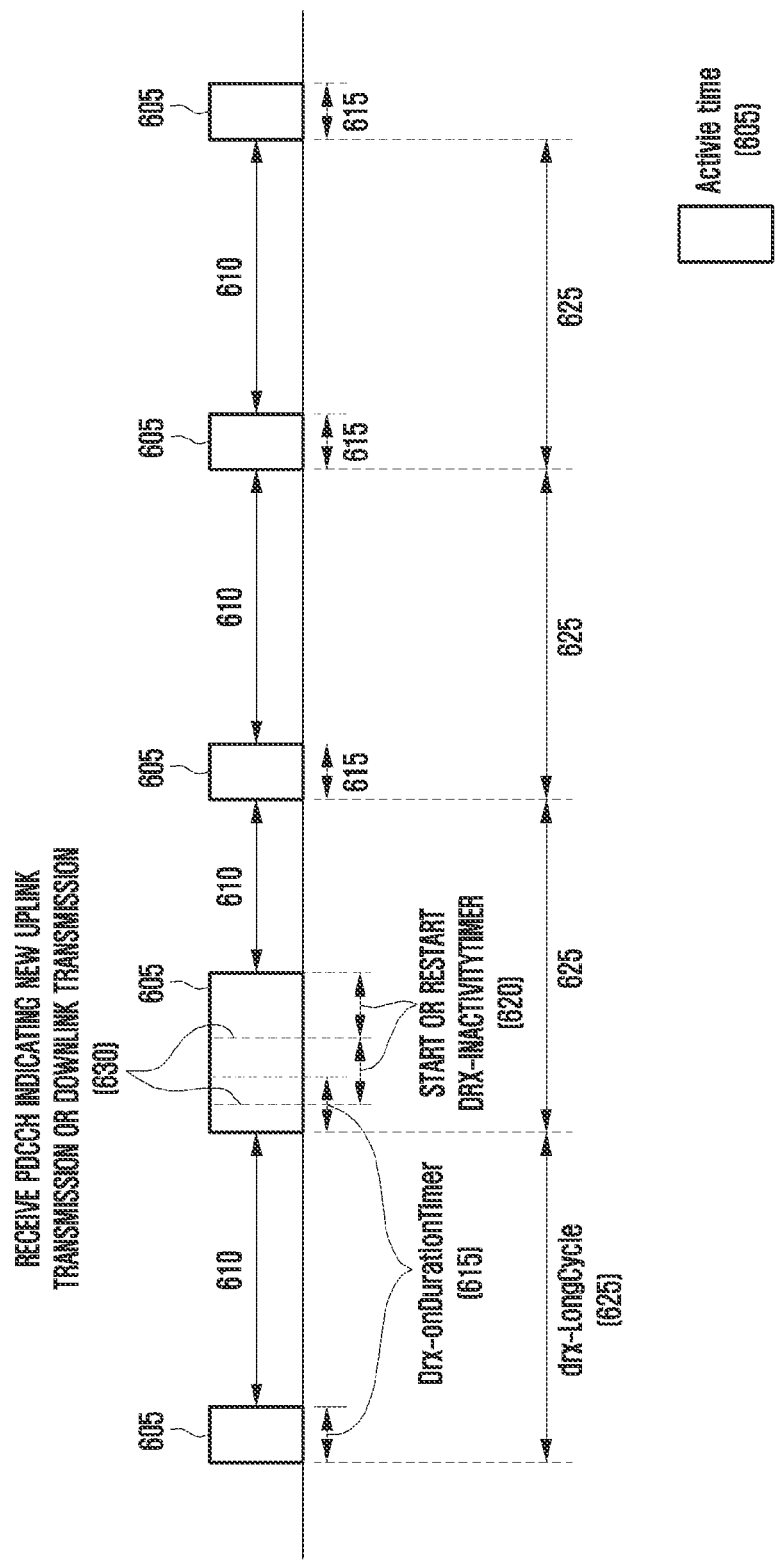
FIG. 6 illustrates an example of a discontinuous reception (DRX) operation in the next-generation mobile communication system according to an embodiment of the disclosure.

FIG. 6 illustrates an example of a discontinuous reception (DRX) operation in the next-generation mobile communication system according to an embodiment of the disclosure.

DRX is an operation of discontinuously receiving, by a terminal that is using a service, data while in an RRC-connected state in which a radio link is configured between the terminal and the base station. When DRX is applied, the terminal may turn on a receiver at a specified time point to monitor a control channel and turn off the receiver when receiving no data for a predetermined time interval, thereby reducing power consumption of the terminal. The DRX operation may be controlled by a media access control (MAC) layer device according to various parameters and timers.

Referring to FIG. 6, an active time 605 is a time interval for which the terminal wakes up in each DRX cycle and monitors a PDCCH. The active time 605 may be defined as follows:
  drx-onDurationTimer or drx-InactivityTimer or drx-RetransmissionTimerDL or drx-RetransmissionTimerUL or ra-ContentionResolutionTimer is running; or
  a Scheduling Request is sent on PUCCH and is pending;
  a PDCCH indicating a new transmission addressed to the C-RNTI of the MAC entity has not been received after successful reception of a Random Access Response for the Random Access Preamble not selected by the MAC entity among the contention-based Random Access Preamble.

drx-onDurationTimer, drx-InactivityTimer, drx-RetransmissionTimerDL, drx-RetransmissionTimerUL, ra-ContentionResolutionTimer, and the like, are timers, the values of which are configured by the base station, and have a function for configuring the terminal to monitor a PDCCH when a predetermined condition is met.

drx-onDurationTimer 615 is a parameter for configuring a minimum time interval for which the terminal stays awake. drx-InactivityTimer 620 is a parameter for configuring an extra time interval for which the terminal stays awake when a PDCCH indicating new uplink or downlink transmission is received 630. drx-RetransmissionTimerDL is a parameter for configuring a maximum time interval for which the terminal stays awake to receive downlink retransmission in a downlink HARQ process. drx-RetransmissionTimerUL is a parameter for configuring a maximum time interval for which the terminal stays awake to receive an uplink retransmission grant in an uplink HARQ process. drx-onDurationTimer, drx-InactivityTimer, drx-RetransmissionTimerDL, and drx-RetransmissionTimerUL may be configured with, for example, time, the number of subframes, the number of slots, or the like. ra-ContentionResolutionTimer is a parameter for monitoring the PDCCH in a random-access process.

An inactive time 610 is a time interval for which the terminal is configured not to monitor a PDCCH and/or is configured not to receive a PDCCH during the DRX operation, and a time interval remaining after excluding the active time 605 from the entire time interval for which the DRX operation is performed may be the inactive time 610. The terminal may enter a sleep or an inactive state to reduce power consumption while not monitoring the PDCCH during the active time 605.

A DRX cycle refers to a cycle in which the terminal wakes up and monitors the PDCCH. That is, the DRX cycle refers to a time interval from after the terminal monitors the PDCCH to a time point of monitoring the next PDCCH, or an occurrence cycle of on-duration. The DRX cycle has two types: a short DRX cycle and a long DRX cycle. The short DRX cycle may be optionally applied.

The long DRX cycle 625 is a longer cycle of two DRX cycles configured for the terminal. The terminal starts drx-onDurationTimer 615 again at a time point after the lapse of the long DRX cycle 625 from a starting point (for example, a start symbol) of drx-onDurationTimer 615 during the long DRX operation. While operating in the long DRX cycle 625, the terminal may start the drx-onDurationTimer 615 in a slot after drx-SlotOffset in a subframe that satisfies the following Equation 2. Here, the drx-SlotOffset refers to a delay before the drx-onDurationTimer 615 starts. The drx-SlotOffset may be configured with, for example, time, the number of slots, and the like.

$$[(SFN \times 10)+\text{subframe number}] \mod (drx\text{-LongCycle}) = drx\text{-StartOffset} \quad \text{[Equation 2]}$$

In this case, the drx-LongCycleStartOffset may include the long DRX cycle 625 and drx-StartOffset, and may be used to define a subframe to start the long DRX cycle 625. The drx-LongCycleStartOffset may be configured with, for example, time, the number of subframes, the number of slots, and the like.

Hereinafter, a carrier aggregation and scheduling method in the 5G communication system will be described in detail.

The terminal may be configured with multiple cells (cells or component carriers (CCs)) from the base station and may be configured as to whether to perform cross-carrier scheduling on the cells configured for the terminal. When the cross-carrier scheduling is configured for a specific cell (cell A or scheduled cell), PDCCH monitoring for cell A may not be performed in cell A, but may be performed in other cells (cell B or scheduling cell) indicated by the cross-carrier scheduling. In this case, the scheduled cell (cell A) and the scheduling cell (cell B) may be configured by different numerologies. The numerology may include subcarrier spacing, cyclic prefix, and the like. When the numerologies of cell A and cell B are different from each other, the following minimum scheduling offset may be additionally considered between the PDCCH and the PDSCH when the PDCCH of cell B schedules the PDSCH of cell A.

[Cross-Carrier Scheduling Method]

When subcarrier spacing ($\mu_B$) of cell B is less than subcarrier spacing ($\mu_A$) of cell A, the PDSCH may be scheduled from the next PDSCH slot that corresponds to X symbols after from the last symbol of the PDCCH received in cell B. Here, X may be different according to $\mu_B$. X=4 symbols may be defined when $\mu_B$=15 kHz, X=4 symbols may be defined when $\mu_B$=30 kHz, and X=8 symbols may be defined when $\mu_B$=60 kHz.

When subcarrier spacing ($\mu_B$) of cell B is greater than subcarrier spacing ($\mu_A$) of cell A, the PDSCH may be scheduled from a time point that corresponds to X symbols after the last symbol of the PDCCH received in cell B. Here, X may be different according to $\mu_B$. X=4 symbols may be defined when $\mu_B$=30 kHz, X=8 symbols may be defined when $\mu_B$=60 kHz, and X=12 symbols may be defined when $\mu_B$=120 kHz.

Hereinafter, description of embodiments of the disclosure will be made in detail with reference to accompanying drawings. The 5G system is described as an example in the disclosure, but embodiments of the disclosure may be applied to other communication systems having a similar technical background or channel type. For example, a mobile communication technology developed beyond the LTE or LTE-A mobile communication system and the 5G system can be included therein. Therefore, an embodiment of the disclosure may be applied to other communication systems through some modifications without greatly departing from the range of the disclosure according to a determination of those having skilled technical knowledge.

Furthermore, in describing the disclosure, a detailed description of a related function or configuration will be omitted if it is deemed to make the gist of the disclosure unnecessarily vague. Furthermore, terms to be described below have been defined by taking into consideration functions in the disclosure, and may be different depending on a user or an operator's intention or practice. Accordingly, each term should be defined based on contents over the entire specification.

Hereinafter, higher-layer signaling may be signaling corresponding to at least one or a combination of one or more of the following signaling types.

Master Information Block (MIB)
System Information Block (SIB) or SIB X (X=1, 2, . . . )
Radio Resource Control (RRC)
Medium Access Control (MAC) Control Element (CE)

In addition, L1 signaling may be signaling corresponding to at least one of the following physical layer channels or signaling methods or a combination of one or more of the following physical layer channels or signaling methods.

Physical Downlink Control Channel (PDCCH)
Downlink Control Information (DCI)
UE-specific DCI
Group common DCI
Common DCI
Scheduling DCI (for example, DCI for downlink or uplink data scheduling)
Non-scheduling DCI (for example, DCI not for downlink or uplink data scheduling)
Physical Uplink Control Channel (PUCCH)
Uplink Control Information (UCI)

First Embodiment

In the first embodiment, a method for allocating a time domain resource for a data channel in the next-generation mobile communication system (5G or NR system) will be described.

The base station may configure a table for time domain resource allocation information for a PDSCH and a PUSCH for the terminal through higher-layer signaling (for example, SIB or RRC signaling). For the PDSCH, a table including up to 16 (maxNrofDL-Allocations=16) entries may be configured, and for the PUSCH, a table including up to 16 (maxNrofUL-Allocations=16) entries may be configured. The time domain resource allocation information may include a PDCCH-to-PDSCH slot timing (corresponding to a time interval in units of slots between a time point at which a PDCCH is received and a time point at which a PDSCH scheduled by the received PDCCH is transmitted, and denoted as "K0"), a PDCCH-to-PUSCH slot timing (corresponding to a time interval in units of slots between a time point at which a PDCCH is received and a time point at which a PUSCH scheduled by the received PDCCH is transmitted, and denoted as "K2"), information relating to the position and the length of a start symbol in the slot, in which the PDSCH or the PUSCH is scheduled, a mapping type of the PDSCH or the PUSCH, etc. For example, information as in Table 7 and Table 8 above may be notified from the base station to the terminal.

According to an embodiment of the disclosure, the base station may notify the terminal of one of the entries in the table relating to the time domain resource allocation information via L1 signaling (e.g., via the DCI, e.g., by using a "time domain resource allocation" field in the DCI). The terminal may obtain the time domain resource allocation information for the PDSCH or the PUSCH by using the DCI received from the base station.

When an entry having a value of 0 for K0/K2 is indicated, it means that a PDCCH and a data channel are scheduled in the same slot, and is referred to as "self-slot scheduling".

When an entry having a value larger than 0 for K0/K2 is indicated, it means that a PDCCH and a data channel are scheduled in different slots, and is referred to as "cross-slot scheduling".

In the next-generation mobile communication system (5G or NR system), for reducing power consumption of the terminal, the cross-slot scheduling may be used. When the cross-slot scheduling is supported, the terminal may operate in a sleep mode between a time point at which a PDCCH is received and a time point at which a data channel transmission or reception occurs, and thus power consumption can be reduced. In addition, when the cross-slot scheduling is supported, the terminal may spend a longer time for processing the PDCCH, and accordingly, slowing down an operation speed and reducing power consumption. In addition, the time domain scheduling information for the PDSCH may be finally acquired once decoding is completed after PDCCH reception. Accordingly, during a time interval for receiving and decoding the PDCCH, the terminal is not able to identify whether the PDSCH is scheduled, and thus buffering for OFDM symbols, in which the PDSCH can be scheduled, needs to be performed, whereby the power consumption of the terminal can be largely increased. If the terminal is able to identify the time domain resource allocation information of the PDSCH before decoding the PDCCH, that is, if the terminal is able to identify that cross-slot scheduling is performed in advance, the terminal can minimize unnecessary buffering for the PDSCH, whereby the power consumption can be reduced.

For reducing power consumption of the terminal, the base station may indicate, to the terminal via higher-layer signaling or L1 signaling, the minimum K0/K2 value to be used for data channel scheduling. The terminal may expect that the scheduling is always performed by using the K0/K2 value corresponding to a value equal to or larger than the minimum K0/K2 value received from the base station. For convenience of description, the minimum K0/K2 value indicated to the terminal by the base station is referred to as a "minimum offset".

The minimum offset value may be indicated to the terminal by the base station via DCI (for example, DCI format 1_1 or DCI format 0_1) for scheduling the PDSCH or the PUSCH or via non-scheduling DCI (for example, a new DCI format defined for reducing power consumption, a new RNTI defined for reducing power consumption, DCI format 2_0, DCI format 2_1, or the like). The terminal may receive different values for the K0 minimum offset value ($K0_{min}$) and the K2 minimum offset value ($K2_{min}$), respectively, or may receive one value for the K0 and the K2 minimum offset value ($K_{min}$). In the disclosure, a case in which one minimum offset value, $K_{min}$, is indicated is assumed and described, but the details of the disclosure may be applied in the same manner as in a case in which $K0_{min}$ and $K2_{min}$ are separately indicated.

According to an embodiment of the disclosure, the terminal may expect that scheduling is to be performed with only an entry having a K0/K2 value equal to or larger than the indicated minimum offset value, among values in the pre-configured time domain resource allocation table, according to the minimum offset received from the base station. For example, a case in which the base station has configured the PDSCH time domain resource allocation table below for the terminal is assumed.

TABLE 14

| Entry index | PDSCH mapping type | K0 | Starting symbol | Length |
|---|---|---|---|---|
| 1 | Type A | 0 | 2 | 8 |
| 2 | Type A | 0 | 2 | 10 |
| 3 | Type A | 1 | 2 | 9 |
| 4 | Type A | 1 | 2 | 7 |
| 5 | Type A | 2 | 2 | 5 |
| 6 | Type B | 2 | 9 | 4 |
| 7 | Type B | 3 | 4 | 4 |
| 8 | Type B | 4 | 5 | 7 |
| 9 | Type B | 5 | 5 | 2 |
| 10 | Type B | 7 | 9 | 2 |
| 11 | Type B | 8 | 12 | 1 |
| 12 | Type A | 9 | 1 | 10 |
| 13 | Type A | 10 | 1 | 6 |
| 14 | Type A | 21 | 2 | 4 |
| 15 | Type B | 30 | 4 | 7 |
| 16 | Type B | 32 | 8 | 4 |

If the base station indicates the minimum offset value of 3 to the terminal, the terminal may expect that scheduling is not performed with entries having the K0 value smaller than 3, that is, entry indices 1, 2, 3, 4, 5, and 6, and may expect that scheduling is to be performed with the remaining entries, that is, entry indices 7, 8, . . . , and 16. For convenience of description, the following terms are defined.

Valid entry: A valid entry is an entry having a K0/K2 value equal to or larger than the received minimum offset value, among values in the pre-configured time domain resource allocation table, and can be used for scheduling.

Invalid entry: An invalid entry is an entry having a K0/K2 value smaller than the received minimum offset, among values in the pre-configured time domain resource allocation table, and cannot be used for scheduling.

According to an embodiment of the disclosure, the terminal may receive the minimum offset value via DCI transmitted at a particular time point, from the base station, and may apply the received minimum offset value after a particular time point from a minimum offset value reception time point. For example, the minimum offset value may be indicated to the terminal by the base station via DCI received through the PDCCH transmitted at a $T_0$ time point, and the terminal may apply the newly acquired minimum offset value from a time point ($T_{app}$) after a particular time interval ($T_{delay}$) passes. In this case, $T_{app}$ may be expressed by using a function of $T_0$ and $T_{delay}$. If the terminal has received DCI indicating the minimum offset value from the $T_0$ time point from the base station, the terminal may not expect that the indicated minimum offset value is applied before $T_{app}$. Here, applying the minimum value may correspond to a terminal operation of applying the minimum value by determining whether entries in the time domain resource allocation table configured via higher-layer signaling are valid or invalid according to the received minimum offset value.

Figure 7:
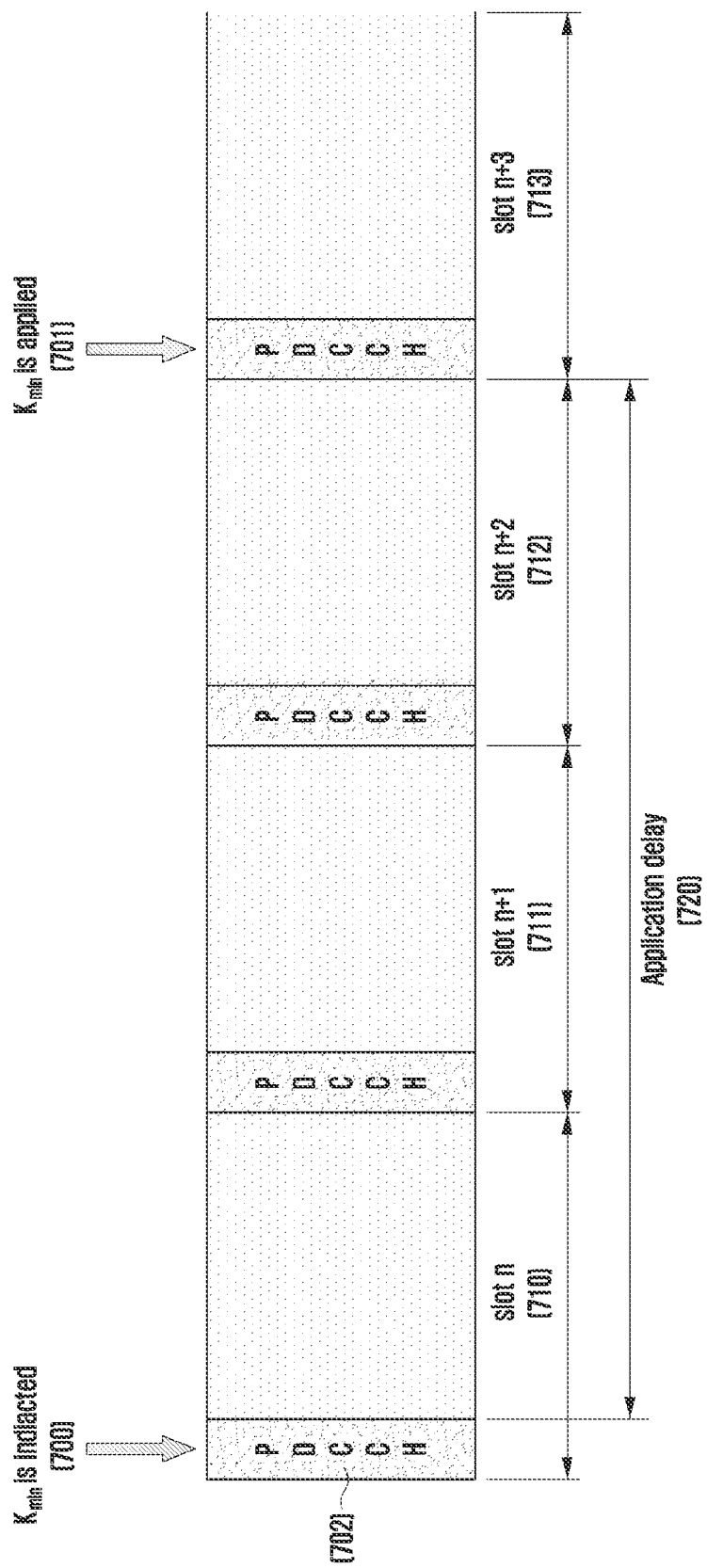
FIG. 7 illustrates an example of a cross-slot scheduling method according to some embodiments of the disclosure.

FIG. 7 illustrates an example of a cross-slot scheduling method according to an embodiment of the disclosure.

As described above, the base station may indicate, to the terminal via DCI, the minimum offset value, $K_{min}$, through a PDCCH 702 transmitted at a particular time point (operation 700). $K_{min}$ may be indicated to the terminal by the base station through the PDCCH 702 at a $T_0$ time point (corresponding to slot n 710 in the example of FIG. 7). The terminal may apply the $K_{min}$ value received from the base station, from a time point $T_{app}$ after a predetermined time interval ($T_{delay}$) passes from $T_0$ (corresponding to slot n 710 in the example of FIG. 7) at which $K_{min}$ is received. The example of FIG. 7 shows that the terminal applies $K_{min}$ received in slot n 700, in slot n+k (k=3) 713. A time interval between a time point at which $K_{min}$ is received and a time point at which $K_{min}$ is applied is referred to as an "application delay time interval (application delay)" 720, and is indicated as "$T_{delay}$".

The terminal may operate in a "power reduction mode" during the above-described application delay time interval. Here, when the terminal operates in a power reduction mode, it means that the terminal operates according to a combination of one or more of the following operations.

An operation of reducing power consumption by increasing a PDCCH processing time An operation of reducing power consumption by not performing buffering for an OFDM symbol An operation of reducing power consumption by operating in a sleep mode That is, by considering the above-described application delay time interval, power consumption of the terminal can be reduced.

The above-described application delay time interval may be determined according to at least one function among the parameters below.

PDCCH subcarrier spacing ($\mu 0$)

PDSCH subcarrier spacing ($\mu 1$)

PUSCH subcarrier spacing ($\mu 2$)

PDCCH processing time ($T_{proc1}$)

Relaxed PDCCH processing time (corresponding to a longer time than the PDCCH processing time) ($T_{proc2}$)

PDCCH-related configuration information (for example, the position of a starting or last symbol of the PDCCH), CORESET-related configuration information (a CORESET symbol length, CORESET frequency allocation information, precoding-related configuration information, etc.), search space-related configuration information (a slot-unit monitoring period and offset, a symbol-unit monitoring occasion, the number of PDCCH candidates, etc.)

A minimum value of an application delay time interval ($T_{delay,min}$)

A maximum value of an application delay time interval ($T_{delay,max}$)

Whether cross-carrier scheduling is configured

A minimum value of a PDSCH scheduling offset ($K0_{min,2}$)

A minimum value of a PUSCH scheduling offset ($K2_{min,2}$)

A minimum offset value assumed by a terminal before a newly indicated minimum offset value (i.e., a minimum offset value assumed by a terminal at a time point ($T_0$) at which the minimum offset value is received) ($K0_{min,pre}$, $K2_{min,pre}$, $K_{min,pre}$)

Hereinafter, various embodiments of a method for determining the above-described application delay time interval will be described.

In describing the disclosure, parameters below will be defined and used.

$T_0$: A time point at which DCI including a minimum offset value is received $T_{delay}$: An application delay time interval $T_{app}$: A time point at which the received minimum offset value is applied In describing the disclosure, functions below will be defined and used.

min(A,B): A function outputting a smaller value of A and B, or a value equal to A and B max(A,B): A function outputting a larger value of A and B. or a value equal to A and B ceil(X): A function outputting the smallest integer among integers equal to or larger than X floor(X): A function outputting the largest integer among integers equal to or smaller than X (1-1)-th Embodiment According to an embodiment of the disclosure, an application delay time interval ($T_{delay}$) may be expressed by using a function of PDCCH subcarrier spacing (μ0), PDSCH subcarrier spacing (μ1), or PUSCH subcarrier spacing (μ2), a minimum value of an application delay time interval ($T_{delay,min}$), and a minimum offset value ($K_{min,pre}$) applied or assumed by the terminal before a newly indicated minimum offset value.

According to an embodiment of the disclosure, a time point ($T_0$) at which DCI indicating the minimum offset is received and an application delay time interval ($T_{delay}$) may be defined in units of slots. For example, when the terminal acquires an indicator for the minimum offset value at $T_0$ (=slot n), the terminal may apply the newly indicated minimum offset value from $T_{app}=T_0$ (=slot n)+$T_{delay}$.

According to an embodiment of the disclosure, scaling may be applied to the application delay time interval ($T_{delay}$) by considering subcarrier spacing of a PDCCH, a PDSCH, or a PUSCH and a situation in which a control channel has subcarrier spacing different from that of a data channel. More specifically, when the terminal has received DCI including an indicator for the minimum offset in slot n with reference to PDCCH subcarrier spacing (μ0), and the PDSCH or the PUSCH subcarrier spacing scheduled by the corresponding DCI is μ1 or μ2, a time point at which the minimum offset is to be applied after the application delay time interval ($T_{delay}$) may be determined by reconverting a slot index. A scaling parameter, S, may be considered to reconvert the slot index. For example, when a PDCCH including an indicator for the minimum offset is received in slot n, the newly indicated minimum offset value may be applied from g ((slot n+$T_{delay}$)*S). Here, g(•) may correspond to a predetermined function. In an example, S may correspond to a scaling parameter based on subcarrier spacing of a data channel, and may be defined as, for example, $S=2^{(\mu 1-\mu 0)}$ (or $S=2^{(\mu 2-\mu 0)}$). In another example, S may correspond to a scaling parameter based on the minimum value (or the maximum value) of subcarrier spacing of the data channel and the PDCCH, and may be determined as $S=2^{(\mu ref-\mu 0)}$, μref=min(μ0, μ1) (or μref=min(μ0, μ2)) or $S=2^{(\mu ref-\mu 0)}$, μref=max(μ0, μ1) (or μref=max(μ0, μ2)).

According to an embodiment of the disclosure, in determining the application delay time interval ($T_{delay}$) the minimum value ($K_{min,pre}$) applied or assumed by the terminal before the newly indicated minimum offset value may be considered. For example, $T_{delay}$ may be expressed by using a function of $K_{min,pre}$. This may be more advantageous in reducing power consumption of the terminal. More specifically, for example, when the terminal assumes $K_{min,pre}$=X the terminal may operate, spending a longer PDCCH processing time according to an X value in order to reduce power consumption of the terminal. For example, the terminal may perform decoding for the PDCCH by extending the PDCCH processing time by X. In this case, a time point at which decoding for DCI indicating a new minimum offset value is completed may be after X, and accordingly, the terminal may acquire the new minimum offset value after X. Accordingly, the application delay time interval, $T_{delay}$, may have a value at least equal to or larger than X. Therefore, defining the application delay time interval ($T_{delay}$) by considering $K_{min,pre}$ can be more advantageous in increasing an effect of reducing power consumption of the terminal.

According to an embodiment of the disclosure, in determining the application delay time interval ($T_{delay}$), the minimum application delay time interval ($T_{delay,min}$) may be considered. $T_{delay,min}$ may correspond to the minimum value of the application delay time interval that the terminal can assume, and may be defined as a value satisfying $T_{delay,min} \geq 0$. When $T_{delay}=T_{delay,min}=0$, it means that the terminal applies the received minimum offset value in a slot in which the corresponding minimum offset value is received.

$T_{delay,min}$ may be predefined or configured for the terminal by the base station via higher-layer signaling. Alternatively, $T_{delay,min}$ may be determined by various system parameters (for example, the minimum scheduling offset required during cross-carrier scheduling, the minimum scheduling offset required during a bandwidth part switch, other interruption time, a PDCCH processing time, etc.).

For example, $T_{delay,min}$ may be determined by whether cross-carrier scheduling is configured and the minimum scheduling offset value according to the cross-carrier scheduling. The terminal may be configured with multiple cells (cells or component carriers (CCs)) from the base station and may be configured as to whether to perform cross-carrier scheduling on the cells configured for the terminal. When the cross-carrier scheduling is configured for a specific cell (cell A or scheduled cell), PDCCH monitoring for cell A may not be performed in cell A, but may be performed in other cells (cell B or scheduling cell) indicated by the cross-carrier scheduling. In this case, the scheduled cell (cell A) and the scheduling cell (cell B) may be configured by different numerologies. The numerology may include subcarrier spacing, cyclic prefix, and the like. When the numerologies of cell A and cell B are different from each other, the following minimum scheduling offset may be additionally considered between the PDCCH and the PDSCH when the PDCCH of cell B schedules the PDSCH of cell A (see [cross-carrier scheduling method] above). The minimum scheduling offset required during the cross-carrier scheduling between cells having different numerologies is defined as $T_{offset,min}$. When DCI indicating the minimum offset received in cell B by the terminal corresponds to DCI (i.e., DCI of cell A) corresponding to the cross-carrier scheduling, and subcarrier spacing of cell A is different from that of cell B (defined as "condition A"), $T_{offset,min}$ may be additionally considered in determining $T_{delay,min}$ (for example, $T_{delay,min}=T_{offset,min}$).

In another example, $T_{delay,min}$ may be determined by the minimum scheduling offset value according to the switch of the bandwidth part. When the terminal has received DCI including a bandwidth part switch indicator in slot n, the terminal may complete the switch to a new bandwidth part indicated by the bandwidth part switch indicator at a time point no later than slot n+$T_{BWP}$, and may perform transmission or reception for the data channel scheduled by the corresponding DCI in the switched new bandwidth part. When the base station is to schedule a data channel in a new bandwidth part, the base station may determine time domain resource allocation for the data channel by considering the bandwidth part switch delay time interval ($T_{BWP}$) of the terminal. That is, in a method for determining time domain resource allocation for a data channel when the base station schedules the data channel in a new bandwidth part, scheduling for the corresponding data channel may be performed after a bandwidth part switch delay time interval. Accordingly, the terminal may not expect that DCI indicating the bandwidth part switch indicates a value of a slot offset (K0 or K2) smaller than the value of the bandwidth part switch delay time interval ($T_{BWP}$). The minimum scheduling offset considering the bandwidth part switch delay time interval, $T_{BWP}$WP, may be indicated as $T_{offset,min}$. When the DCI indicating the minimum offset received by the terminal indicates a bandwidth part switch, $T_{offset,min}$ may be additionally considered in determining $T_{delay,min}$ (for example, $T_{delay,min}=T_{offset,min}$).

In another example, $T_{delay,min}$ may be determined by a PDCCH processing time of the terminal. For example, when the PDCCH processing time capability of the terminal is $T_{offset,min}$, $T_{delay,min}=T_{offset,min}$.

In addition to the above-described examples, in a situation in which an interruption time interval for which terminal scheduling is restricted or the minimum scheduling offset (collectively indicated as $T_{offset,min}$) or the PDCCH processing time is to be considered, $T_{delay,min}$ may be determined by $T_{offset,min}$ in the same manner. Here, $T_{offset,min}$ may have a slot unit. When there are multiple $T_{offset,min}$ values to be simultaneously considered, a value corresponding to the maximum value of multiple $T_{offset,min}$ values may be used to determine $T_{delay,min}$. For example, when the minimum value predefined as a default value is $T_{offset,min0}$, the minimum scheduling offset according to cross-carrier scheduling between cells configured to have different numerologies is $T_{offset,min1}$, and the minimum scheduling offset considering the bandwidth part switch delay time interval is $T_{offset,min2}$, $T_{delay,min}$ may be determined according to $T_{delay,min}=\max(T_{offset,min0}, T_{offset,min1}, T_{offset,min2})$.

Considering the above-mentioned parameters, the application delay time interval ($T_{delay}$) and a time point ($T_{app}$) at which a newly indicated minimum offset is applied may be determined according to the equation below. Each parameter in the equation below may follow the details of the above-described embodiment.

$$T_{app}=\text{ceil}(T_0+T_{delay})*S \text{ where } T_{delay}=\max(K_{min,pre}, T_{delay,min})$$ [Equation 1-1]

$$T_{app}=T_0*S+T_{delay} \text{ where } T_{delay}=\max(K_{min,pre}, T_{delay,min})*S$$ [Equation 1-2]

$$T_{app}=\text{ceil}(T_0+T_{delay})*S \text{ where } T_{delay}=K_{min,pre}$$ [Equation 1-3]

$$T_{app}=T_0*S+T_{delay} \text{ where } T_{delay}=K_{min,pre}*S$$ [Equation 1-4]

The equations above may be applied in the same manner as in the case of the PDSCH and the PUSCH, or may be applied to each of the PDSCH case by substituting $K_{min,pre}$ for $K0_{min,pre}$, and to the PUSCH case by substituting $K_{min,pre}$ for $K2_{min,pre}$.

Some of the parameters in the equations above may be omitted, or some parameters may be added to the equations above.

(1-2)-th Embodiment

According to an embodiment of the disclosure, an application delay time interval ($T_{delay}$) may be expressed by using a function of PDCCH subcarrier spacing ($\mu 0$), PDSCH subcarrier spacing ($\mu 1$), or PUSCH subcarrier spacing ($\mu 2$), a minimum value of an application delay time interval ($T_{delay,min}$), a maximum value of an application delay time interval ($T_{delay,max}$), and a minimum offset value ($K_{min,pre}$) applied or assumed by the terminal before a newly indicated minimum offset value.

According to an embodiment of the disclosure, an application delay time interval ($T_{delay}$) may be defined in units of slots. For example, when the terminal acquires an indicator for the minimum offset value at $T_0$ (=slot n), the terminal may apply the newly indicated minimum offset value from $T_{app}=T_0$ (=slot n)+$T_{delay}$.

According to an embodiment of the disclosure, scaling may be applied to the application delay time interval ($T_{delay}$) by considering subcarrier spacing of a PDCCH, a PDSCH, or a PUSCH and a situation in which a control channel has subcarrier spacing different from that of a data channel. More specifically, when the terminal has received DCI including an indicator for the minimum offset in slot n with reference to PDCCH subcarrier spacing ($\mu 0$), and the PDSCH or the PUSCH subcarrier spacing scheduled by the corresponding DCI is $\mu 1$ or $\mu 2$, a time point at which the minimum offset is to be applied after the application delay time interval ($T_{delay}$) may be determined by reconverting a slot index. A scaling parameter, $S$, may be considered to reconvert the slot index. For example, when a PDCCH including an indicator for the minimum offset is received in slot n, the newly indicated minimum offset value may be applied from g (($\text{slot } n+T_{delay}$)*S). Here, g(•) may correspond to a predetermined function. In an example, $S$ may correspond to a scaling parameter based on subcarrier spacing of a data channel, and may be defined as, for example, $S=2^{(\mu 1-\mu 0)}$ (or $S=2^{(\mu 2-\mu 0)}$). In another example, $S$ may correspond to a scaling parameter based on the minimum value (or the maximum value) of subcarrier spacing of the data channel and the PDCCH, and may be determined as $S=2^{(\mu ref-\mu 0)}$, $\mu ref=\min(\mu 0, \mu 1)$ (or $\mu ref=\min(\mu 0, \mu 2)$) or $S=2^{(\mu ref-\mu 0)}$, $\mu ref=\max(\mu 0, \mu 1)$ (or $\mu ref=\max(\mu 0, \mu 2)$).

According to an embodiment of the disclosure, in determining the application delay time interval ($T_{delay}$), the minimum value ($K_{min,pre}$) applied or assumed by the terminal before the newly indicated minimum offset value may be considered. For example, $T_{delay}$ may be expressed according to a function of $K_{min,pre}$. This may be more advantageous in reducing power consumption of the terminal. More specifically, for example, when the terminal assumes $K_{min,pre}=X$, the terminal may operate, spending a longer PDCCH processing time according to an X value in order to reduce power consumption of the terminal. For example, the terminal may perform decoding for the PDCCH by extending the PDCCH processing time by X. In this case, a time point at which decoding for DCI indicating a new minimum offset value is completed may be after X, and accordingly, the terminal may acquire the new minimum offset value after X. Accordingly, the application delay time interval, $T_{delay}$, may have a value at least equal to or larger than X. Therefore, defining the application delay time interval ($T_{delay}$) by considering $K_{min,pre}$ can be more advantageous in increasing an effect of reducing power consumption of the terminal.

According to an embodiment of the disclosure, in determining the application delay time interval ($T_{delay}$), the minimum application delay time interval ($T_{delay,min}$) may be considered. $T_{delay,min}$ may correspond to the minimum value of the application delay time interval that the terminal can assume, and may be defined as a value satisfying $T_{delay,min} \geq 0$. When $T_{delay}=T_{delay,min}=0$, it means that the terminal applies the received minimum offset value in a slot in which the corresponding minimum offset value is received.

$T_{delay,min}$ may be predefined or configured for the terminal by the base station via higher-layer signaling. Alternatively, $T_{delay,min}$ may be determined by various system parameters (for example, the minimum scheduling offset required during cross-carrier scheduling, the minimum scheduling offset required during a bandwidth part switch, other interruption time, a PDCCH processing time, etc.).

For example, $T_{delay,min}$ may be determined by whether cross-carrier scheduling is configured and the minimum scheduling offset value according to the cross-carrier scheduling. The terminal may be configured with multiple cells (cells or component carriers (CCs)) from the base station and may be configured as to whether to perform cross-carrier scheduling on the cells configured for the terminal. When the cross-carrier scheduling is configured for a specific cell (cell A or scheduled cell), PDCCH monitoring for cell A may not be performed in cell A, but may be performed in other cells (cell B or scheduling cell) indicated by the cross-carrier scheduling. In this case, the scheduled cell (cell A) and the scheduling cell (cell B) may be configured by different numerologies. The numerology may include subcarrier spacing, cyclic prefix, and the like. When the numerologies of cell A and cell B are different from each other, the following minimum scheduling offset may be considered between the PDCCH and the PDSCH when the PDCCH of cell B schedules the PDSCH of cell A (see [cross-carrier scheduling method] above). The minimum scheduling offset required during the cross-carrier scheduling between cells having different numerologies is defined as $T_{offset,min}$. When DCI indicating the minimum offset received in cell B by the terminal corresponds to DCI (i.e., DCI of cell A) corresponding to the cross-carrier scheduling, and subcarrier spacing of cell A is different from that of cell B (defined as "condition A"), $T_{offset,min}$ may be additionally considered in determining $T_{delay,min}$ (for example, $T_{delay,min}=T_{offset,min}$).

In another example, $T_{delay,min}$ may be determined by the minimum scheduling offset value according to the switch in the bandwidth part. When the terminal has received DCI including a bandwidth part switch indicator in slot n, the terminal may complete the switch to a new bandwidth part indicated by the bandwidth part switch indicator at a time point no later than slot $n+T_{BWP}$, and may perform transmission or reception for the data channel scheduled by the corresponding DCI in the switched new bandwidth part. When the base station is to schedule a data channel in a new bandwidth part, the base station may determine time domain resource allocation for the data channel by considering the bandwidth part switch delay time interval ($T_{BWP}$) of the terminal. That is, in a method for determining time domain resource allocation for a data channel when the base station schedules the data channel in a new bandwidth part, scheduling for the corresponding data channel may be performed after a bandwidth part switch delay time interval. Accordingly, the terminal may not expect that DCI indicating the bandwidth part switch indicates a value of a slot offset (K0 or K2) smaller than the value of the bandwidth part switch delay time interval ($T_{BWP}$). The minimum scheduling offset considering the bandwidth part switch delay time interval, $T_{BWP}$, may be indicated as $T_{offset,min}$. When the DCI indicating the minimum offset received by the terminal indicates a bandwidth part switch, $T_{offset,min}$ may be additionally considered in determining $T_{delay,min}$ (for example, $T_{delay,min}=T_{offset,min}$).

In another example, $T_{delay,min}$ may be determined by a PDCCH processing time of the terminal. For example, when the PDCCH processing time capability of the terminal is $T_{offset,min}$, $T_{delay,min}=T_{offset,min}$.

In addition to the above-described examples, in a situation in which an interruption time interval for which terminal scheduling is restricted or the minimum scheduling offset (collectively indicated as $T_{offset,min}$) or the PDCCH processing time is to be considered, $T_{delay,min}$ may be determined by $T_{offset,min}$ in the same manner. Here, $T_{offset,min}$ may have a slot unit. When there are multiple $T_{offset,min}$ values to be simultaneously considered, a value corresponding to the maximum value of multiple $T_{offset,min}$ values may be used to determine $T_{delay,min}$. For example, when the minimum value predefined as a default value is $T_{offset,min0}$, the minimum scheduling offset according to cross-carrier scheduling between cells configured to have different numerologies is $T_{offset,min1}$, and the minimum scheduling offset considering the bandwidth part switch delay time interval is $T_{offset,min2}$, $T_{delay,min}$ may be determined according to $T_{delay,min}=\max(T_{offset,min0}, T_{offset,min1}, T_{offset,min2})$.

According to an embodiment of the disclosure, in determining the application delay time interval ($T_{delay}$), a maximum application delay time interval ($T_{delay,max}$) may be considered. $T_{delay,max}$ may correspond to the maximum value of the application delay time interval that the terminal can assume, and may be defined as a value satisfying $T_{delay,max} \geq 0$. That is, for $T_{delay}$, the terminal may not expect the application delay time interval having a value equal to or larger than $T_{delay,max}$. Even when $T_{delay}$ is determined by $K_{min,pre}$, the minimum offset value received within a particular time interval having a value smaller than $K_{min,pre}$ that the terminal is currently assuming is to be applied according to $T_{delay,max}$. For example, when $K_{min,pre}=X$, $T_{delay,max}=Y$, and $Y<X$, $T_{delay}$ may be determined to have a value of Y. In this case, the base station may change the minimum offset value of the terminal within the delay time interval having a value smaller than $K_{min,pre}$ that the terminal is currently assuming. $T_{delay,max}$ may be configured for the terminal by the base station via higher-layer signaling or may be defined as a fixed value. Alternatively, $T_{delay,max}$ may be defined by a function of various system parameters. For example, $T_{delay,max}$ may be defined by the PDCCH processing time, the PDCCH processing time capability, the relaxed PDCCH processing time, or the maximum value of the PDCCH processing time of the terminal, a time interval for which buffering for an OFDM symbol of the terminal is not performed, or a function configured with the above-mentioned parameters.

According to an embodiment, in determining the application delay time interval ($T_{delay}$), an additional delay time interval (d0) may be considered. d0 may correspond to a delay time which can be considered in addition to $K_{min,pre}$, and may correspond to a parameter which can be affected by various operations related to reception or transmission of the terminal. In addition, d0 may be defined in units of slots.

In an example, d0 may be determined by a series of terminal operations related to PDCCH reception and decoding or a PDCCH-related configuration parameter. For example, d0 may be determined by the reception symbol position of the PDCCH received by the terminal. When the terminal has received the PDCCH, in which DCI indicating the minimum offset is transmitted, after a particular symbol (for example, after an X-th symbol) in a slot, an additional offset may be considered for the application delay time interval in order for the terminal to secure enough time for PDCCH decoding. In this case, X may be predefined or may be configured by the base station.

Alternatively, d0 may be determined by a PDCCH configuration parameter (for example, a CORESET configuration or a search space configuration) configured for the terminal. For example, d0 may be affected by the number of CCEs and the number of PDCCH candidates (or the number of times of blind-decoding and the number of times of channel estimation) monitored by the terminal.

The number of CCEs and the number of PDCCH candidates monitored by the terminal may be determined by the CORESET configuration and the search space configuration. The terminal may be configured with the number of PDCCH candidates for each aggregation level (AL) via higher-layer signaling, from the base station. When there are a large number of PDCCH candidates and CCEs configured for the terminal, the number of times of blind-decoding and the number of times of channel estimation may increase, and accordingly, the PDCCH decoding time of the terminal may increase. On the other hand, when there are a small number of PDCCH candidates and CCEs configured for the terminal, the number of times of blind-decoding and the number of times of channel estimation may decrease, and accordingly, the PDCCH decoding time of the terminal may decrease. Therefore, an additional delay time interval may be considered according to the number of PDCCH candidates and the number of CCEs configured for the terminal upon the CORESET configuration and the search space configuration.

The number of CCEs and the number of PDCCH candidates monitored by the terminal may vary according to a cell (a cell or a component carrier (CC)) configuration for carrier aggregation and a cross-carrier scheduling configuration. The terminal may be configured with multiple cells (cells or CCs) from the base station, and may be configured as to whether to perform cross-carrier scheduling on the cells configured for the terminal. When the cross-carrier scheduling is configured for a specific cell (cell A or scheduled cell), PDCCH monitoring for cell A may not be performed in cell A, but may be performed in other cells (cell B or scheduling cell) indicated by the cross-carrier scheduling. When PDCCH monitoring for multiple cells is performed in cell B, the number of PDCCH candidates and the number of CCEs of the terminal in cell B may increase. Accordingly, an additional delay time interval may be considered according to the cross-carrier scheduling configuration. Considering the description above, d0 may be determined by, for example, at least one or a combination of one or more methods below.

Method 1

If the last symbol in which the terminal has received the PDCCH transmitting the DCI indicating the minimum offset corresponds to a symbol after an X-th symbol in a slot, d0=A, otherwise, d0=B.

(For example, X=3, A=1, and B=0.)

Method 2

If the number of PDCCH candidates, M, or the number of CCEs, C, is larger than a predetermined threshold X1 or X2 in a slot in which the terminal has received the PDCCH transmitting the DCI indicating the minimum offset, d0=A, otherwise, d0=B.

(For example, X1 and X2 correspond to predetermined values of M and C, respectively, and may be predefined or configured by the base station. Each of X1 and X2 may have a value associated with the restriction on the maximum number of PDCCH candidates (Table 12) or the restriction on the maximum number of CCEs (Table 13). A=1 and B=0.)

Method 3

If a "first PDCCH configuration" is satisfied in a slot in which the terminal has received the PDCCH transmitting the DCI indicating the minimum offset, d0=A, otherwise, d0=B.

(For example, the "first PDCCH configuration" may correspond to a combination of configuration values which can affect an increase in the PDCCH decoding time, among various PDCCH configuration values. For example, the configuration values may include the last symbol in which the PDCCH is received, the number of PDCCH candidates, the number of CCEs, whether the cross-carrier scheduling is configured, a CORESET-related parameter, and a search space-related parameter.)

Considering the above-mentioned parameters, the application delay time interval ($T_{delay}$) and a time point ($T_{app}$) at which a newly indicated minimum offset is applied may be determined according to the equation below. Each parameter in the equations below may follow the details of the above-described embodiment.

$$T_{app}=\text{ceil}(T_0+T_{delay})*S \quad \text{where} \quad T_{delay}=\min(\max(K_{min,pre},T_{delay,min})+d0,T_{delay,max}) \quad \text{[Equation 2-1]}$$

$$T_{app}=T_0*S+T_{delay} \text{ where } T_{delay}=\min(\max(K_{min,pre},T_{delay,min})+d0,T_{delay,max})*S \quad \text{[Equation 2-2]}$$

The equations above may be applied in the same manner as in the case of the PDSCH and the PUSCH, or may be applied to each of the PDSCH case by substituting $K_{min,pre}$ for $K0_{min,pre}$, and to the PUSCH case by substituting $K_{min,pre}$ for $K2_{min,pre}$.

Some of the parameters in the equations above may be omitted, or some parameters may be added to the equations above.

(1-3)-th Embodiment

According to an embodiment of the disclosure, an application delay time interval ($T_{delay}$) may be expressed by using a function of PDCCH subcarrier spacing ($\mu 0$), PDSCH subcarrier spacing ($\mu 1$), or PUSCH subcarrier spacing ($\mu 2$), a minimum value of an application delay time interval ($T_{delay,min}$), a maximum value of an application delay time interval ($T_{delay,max}$), and a minimum offset value ($K_{min,pre}$) applied or assumed by the terminal before a newly indicated minimum offset value.

According to an embodiment of the disclosure, a time point ($T_0$) at which the DCI indicating the minimum offset is received and an application delay time interval ($T_{delay}$) may be defined in units of symbols. In this case, $T_0$ may be defined as the last symbol of the PDCCH in which the DCI indicating the minimum offset is received, the first symbol of the PDCCH in which the DCI indicating the minimum offset is received, the third symbol in a slot in which the DCI indicating the minimum offset is received, or the like. For example, when the terminal acquires an indicator for the minimum offset value at $T_0$, the terminal may apply the newly indicated minimum offset value from a time point after a $T_{app}$ ($T_{app}=T_0+T_{delay}$) symbol.

According to an embodiment, a time point at which the minimum offset is applied may be quantized in units of slots. That is, the minimum offset may be applied in the next PDSCH or PUSCH slot corresponding to a time point after $T_{delay}$ symbols from $T_0$ corresponding to a symbol at which the DCI indicating the minimum offset is received. For example, when $T_0$ corresponds to the last symbol of the PDCCH in which the DCI indicating the minimum offset is received in slot n, the terminal may apply the minimum offset from the PDSCH or PUSCH slot corresponding to slot n+k (for example, k may be defined according to k=ceil(($T_0+T_{delay}$)/$N_{symb}$) which is the first slot coming after the $T_0+T_{delay}$ symbol.

According to an embodiment, for the time point at which the minimum offset is applied, quantization in units of slots may not be applied. That is, the minimum offset may be applied from the PDSCH or PUSCH symbol corresponding to a symbol after $T_{delay}$ symbols from $T_0$ corresponding to a time point at which the DCI indicating the minimum offset is received.

According to an embodiment of the disclosure, scaling may be applied to the application delay time interval ($T_{delay}$) by considering subcarrier spacing of a PDCCH, a PDSCH, or a PUSCH and a situation in which a control channel has subcarrier spacing different from that of a data channel. More specifically, when the terminal has received DCI including an indicator for the minimum offset in symbol n with reference to PDCCH subcarrier spacing (μ0), and the PDSCH or the PUSCH subcarrier spacing scheduled by the corresponding DCI is μ1 or μ2, a time point at which the minimum offset is to be applied after the application delay time interval ($T_{delay}$) may be determined by reconverting a symbol index. A scaling parameter, S, may be considered to reconvert the slot index. For example, when a PDCCH including an indicator for the minimum offset is received in symbol n, the newly indicated minimum offset value may be applied from g ((symbol n+$T_{delay}$)*S). Here, g(•) may correspond to a predetermined function (for example, g(•) may correspond to the above-described function quantized in units of slots.). In an example, S may correspond to a scaling parameter based on subcarrier spacing of a data channel, and may be defined as, for example, $S=2^{(\mu1-\mu0)}$ (or $S=2^{(\mu2-\mu0)}$). In another example, S may correspond to a scaling parameter based on the minimum value (or the maximum value) of subcarrier spacing of the data channel and the PDCCH, and may be determined as, for example, $S=2^{(\mu ref-\mu0)}$, μref=min(μ0, μ1) (or μref=min(μ0, μ2)) or $S=2^{(\mu ref-\mu0)}$, ρref=max(μ0, μ1) (or μref=max(μ0, μ2)). In another example, S may correspond to a scaling parameter based on the minimum value (or the maximum value) of subcarrier spacing of the control channel and the data channel, and may be determined as $S=2^{-\mu ref2}$, μref2=max(μ0, μ1) or μref2=max(μ0, μ2).

According to an embodiment of the disclosure, in determining the application delay time interval ($T_{delay}$), the minimum value ($K_{min,pre}$) applied or assumed by the terminal before the newly indicated minimum offset value may be considered. For example, $T_{delay}$ may be expressed according to a function of $K_{min,pre}$. This may be more advantageous in reducing power consumption of the terminal. More specifically, for example, when the terminal assumes $K_{min,pre}$=X, the terminal may operate, spending a longer PDCCH processing time according to an X value in order to reduce power consumption of the terminal. For example, the terminal may perform decoding for the PDCCH by extending the PDCCH processing time by X. In this case, a time point at which decoding for DCI indicating a new minimum offset value is completed may be after X, and accordingly, the terminal may acquire the new minimum offset value after X. Accordingly, the application delay time interval, $T_{delay}$, may have a value at least equal to or larger than X. Therefore, defining the application delay time interval ($T_{delay}$) by considering $K_{min,pre}$ can be more advantageous in increasing an effect of reducing power consumption of the terminal.

According to an embodiment of the disclosure, in determining the application delay time interval ($T_{delay}$), the minimum application delay time interval ($T_{delay,min}$) may be considered. $T_{delay,min}$ may correspond to the minimum value of the application delay time interval that the terminal can assume, and may be defined as a value satisfying $T_{delay,min}$≥0. When $T_{delay}=T_{delay,min}=0$, it means that the terminal applies the received minimum offset value immediately from $T_0$ at which the corresponding minimum offset value is received.

According to an embodiment of the disclosure, $T_{delay,min}$ may be predefined or configured for the terminal by the base station via higher-layer signaling. Alternatively, $T_{delay,min}$ may be determined by various system parameters (for example, the minimum scheduling offset required during cross-carrier scheduling, the minimum scheduling offset required during a bandwidth part switch, other interruption time, a PDCCH processing time, etc.).

For example, $T_{delay,min}$ may be determined by whether cross-carrier scheduling is configured and the minimum scheduling offset value according to the cross-carrier scheduling. The terminal may be configured with multiple cells (cells or component carriers (CCs)) from the base station and may be configured as to whether to perform cross-carrier scheduling on the cells configured for the terminal. When the cross-carrier scheduling is configured for a specific cell (cell A or scheduled cell), PDCCH monitoring for cell A may not be performed in cell A, but may be performed in other cells (cell B or scheduling cell) indicated by the cross-carrier scheduling. In this case, the scheduled cell (cell A) and the scheduling cell (cell B) may be configured by different numerologies. The numerology may include subcarrier spacing, cyclic prefix, and the like. When the numerologies of cell A and cell B are different from each other, the following minimum scheduling offset may be additionally considered between the PDCCH and the PDSCH when the PDCCH of cell B schedules the PDSCH of cell A (see [cross-carrier scheduling method] above). The minimum scheduling offset required during the cross-carrier scheduling between cells having different numerologies is defined as $T_{offset,min}$. When DCI indicating the minimum offset received in cell B by the terminal corresponds to DCI (i.e., DCI of cell A) corresponding to the cross-carrier scheduling, and subcarrier spacing of cell A is different from that of cell B (defined as "condition A"), $T_{offset,min}$ may be additionally considered in determining $T_{delay,min}$ (for example, $T_{delay,min}=T_{offset,min}$).

In another example, $T_{delay,min}$ may be determined by the minimum scheduling offset value according to the switch in the bandwidth part. When the terminal has received DCI including a bandwidth part switch indicator in slot n, the terminal may complete the switch to a new bandwidth part indicated by the bandwidth part switch indicator at a time point no later than slot n+$T_{BWP}$, and may perform transmission or reception for the data channel scheduled by the corresponding DCI in the switched new bandwidth part. When the base station is to schedule a data channel in a new bandwidth part, the base station may determine time domain resource allocation for the data channel by considering the bandwidth part switch delay time interval ($T_{BWP}$) of the terminal. That is, in a method for determining time domain resource allocation for a data channel when the base station schedules the data channel in a new bandwidth part, scheduling for the corresponding data channel may be performed after a bandwidth part switch delay time interval. Accordingly, the terminal may not expect that DCI indicating the bandwidth part switch indicates a value of a slot offset (K0 or K2) smaller than the value of the bandwidth part switch delay time interval ($T_{BWP}$). The minimum scheduling offset considering the bandwidth part switch delay time interval. $T_{BWP}$, may be indicated as $T_{offset,min}$. When the DCI indicating the minimum offset received by the terminal indicates a bandwidth part switch, $T_{offset,min}$ may be additionally considered in determining $T_{delay,min}$ (for example, $T_{delay,min}=T_{offset,min}$).

In another example, $T_{delay,min}$ may be determined by a PDCCH processing time of the terminal. For example, when the PDCCH processing time capability of the terminal is $T_{offset,min}$, $T_{delay,min}=T_{offset,min}$.

In addition to the above-described examples, in a situation in which an interruption time interval for which terminal scheduling is restricted or the minimum scheduling offset (collectively indicated as $T_{offset,min}$) or the PDCCH processing time is to be considered, $T_{delay,min}$ may be determined by $T_{offset,min}$ in the same manner. Here, $T_{offset,min}$ may have a slot unit. When there are multiple $T_{offset,min}$ values to be simultaneously considered, a value corresponding to the maximum value of multiple $T_{offset,min}$ values may be used to determine $T_{delay,min}$. For example, when the minimum value predefined as a default value is $T_{offset,min0}$, the minimum scheduling offset according to cross-carrier scheduling between cells configured to have different numerologies is $T_{offset,min1}$, and the minimum scheduling offset considering the bandwidth part switch delay time interval is $T_{offset,min2}$, $T_{delay,min}$ may be determined according to $T_{delay,min}=\max(T_{offset,min0}, T_{offset,min1}, T_{offset,min2})$.

According to an embodiment of the disclosure, in determining the application delay time interval ($T_{delay}$), a maximum application delay time interval ($T_{delay,max}$) may be considered. $T_{delay,max}$ may correspond to the maximum value of the application delay time interval that the terminal can assume, and may be defined as a value satisfying $T_{delay,max} \geq 0$. $T_{delay,max}$ may be defined in units of symbols. That is, for $T_{delay}$, the terminal may not expect the application delay time interval having a value equal to or larger than $T_{delay,max}$. Even when $T_{delay}$ is determined by $K_{min,pre}$, the minimum offset value received within a particular time interval having a value smaller than $K_{min,pre}$ that the terminal is currently assuming is to be applied according to $T_{delay,max}$. For example, when $K_{min,pre}=X$, $T_{delay,max}=Y$, and $Y<X$, $T_{delay}$ may be determined to have a value of Y. In this case, the base station may change the minimum offset value of the terminal within the delay time interval having a value smaller than $K_{min,pre}$ that the terminal is currently assuming. $T_{delay,max}$ may be configured for the terminal by the base station via higher-layer signaling or may be defined as a fixed value. Alternatively, $T_{delay,max}$ may be defined by a function of various system parameters. For example, $T_{delay,max}$ may be defined by the PDCCH processing time, the PDCCH processing time capability, the relaxed PDCCH processing time, or the maximum value of the PDCCH processing time of the terminal, a time interval for which buffering for an OFDM symbol of the terminal is not performed, or a function configured with the above-mentioned parameters.

According to an embodiment, in determining the application delay time interval ($T_{delay}$), an additional delay time interval (d0) may be considered. d0 may correspond to a delay time which can be considered in addition to $K_{min,pre}$, and may correspond to a parameter which can be affected by various operations related to reception or transmission of the terminal. In addition, d0 may be defined in units of slots.

In an example, d0 may be determined by a series of terminal operations related to PDCCH reception and decoding or a PDCCH-related configuration parameter. For example, d0 may be determined by the reception symbol position of the PDCCH received by the terminal. When the terminal has received the PDCCH, in which DCI indicating the minimum offset is transmitted, after a particular symbol (for example, after an X-th symbol) in a slot, an additional offset may be considered for the application delay time interval in order for the terminal to secure enough time for PDCCH decoding. In this case, X may be predefined or may be configured by the base station.

Alternatively, d0 may be determined by a PDCCH configuration parameter (for example, a CORESET configuration or a search space configuration) configured for the terminal. For example, d0 may be affected by the number of CCEs and the number of PDCCH candidates (or the number of times of blind-decoding and the number of times of channel estimation) monitored by the terminal.

The number of CCEs and the number of PDCCH candidates monitored by the terminal may be determined by the CORESET configuration and the search space configuration. The terminal may be configured with the number of PDCCH candidates for each AL via higher-layer signaling, from the base station. When there are a large number of PDCCH candidates and CCEs configured for the terminal, the number of times of blind-decoding and the number of times of channel estimation may increase, and accordingly, the PDCCH decoding time of the terminal may increase. On the other hand, when there are a small number of PDCCH candidates and CCEs configured for the terminal, the number of times of blind-decoding and the number of times of channel estimation may decrease, and accordingly, the PDCCH decoding time of the terminal may decrease. Therefore, an additional delay time interval may be considered according to the number of PDCCH candidates and the number of CCEs configured for the terminal upon the CORESET configuration and the search space configuration.

The number of CCEs and the number of PDCCH candidates monitored by the terminal may, vary according to a cell (a cell or a component carrier (CC)) configuration for carrier aggregation and a cross-carrier scheduling configuration. The terminal may be configured with multiple cells (cells or CCs) from the base station, and may be configured as to whether to perform cross-carrier scheduling on the cells configured for the terminal. When the cross-carrier scheduling is configured for a specific cell (cell A or scheduled cell), PDCCH monitoring for cell A may not be performed in cell A, but may be performed in other cells (cell B or scheduling cell) indicated by the cross-carrier scheduling. When PDCCH monitoring for multiple cells is performed in cell B, the number of PDCCH candidates and the number of CCEs of the terminal in cell B may increase. Accordingly, an additional delay time interval may be considered according to the cross-carrier scheduling configuration. Considering the description above, d0 may be determined by, for example, at least one or a combination of one or more methods below.

Method 1

If the last symbol in which the terminal has received the PDCCH transmitting the DCI indicating the minimum offset corresponds to a symbol after an X-th symbol in a slot, d0=A, otherwise, d0=B.

(For example, X=3, A>0, and B=0.)

Method 2

If the number of PDCCH candidates, M, or the number of CCEs, C, is larger than a predetermined threshold X1 or X2 in a slot in which the terminal has received the PDCCH transmitting the DCI indicating the minimum offset, d0=A, otherwise, d0=B.

(For example, X1 and X2 correspond to predetermined values of M and C, respectively, and may be predefined or configured by the base station. Each of X1 and X2 may have a value associated with the restriction on the maximum number of PDCCH candidates (Table 12) or the restriction on the maximum number of CCEs (Table 13). A>0 and B=0.)

Method 3

If a "first PDCCH configuration" is satisfied in a slot in which the terminal has received the PDCCH transmitting the DCI indicating the minimum offset, d0=A, otherwise, d0=B.

(For example, the "first PDCCH configuration" may correspond to a combination of configuration values which can affect an increase in the PDCCH decoding time, among various configuration values. For example, the configuration values may include the last symbol in which the PDCCH is received, the number of PDCCH candidates, the number of CCEs, whether the cross-carrier scheduling is configured, a CORESET-related parameter, and a search space-related parameter. A>0 and B=0.)

Considering the above-mentioned parameters, the application delay time interval ($T_{delay}$) and a time point ($T_{app}$) at which a newly indicated minimum offset is applied may be determined according to the equation below. Each parameter in the equations below may follow the details of the above-described embodiment.

$$T_{app} = \text{ceil}(T_0 + T_{delay}) * S \quad \text{where} \quad T_{delay} = \min(\max(K_{min,pre} * N_{symb}, T_{delay,min}) + d0, T_{delay,max}) \quad \text{[Equation 3-1]}$$

$$T_{app} = T_0 * S + T_{delay} \quad \text{where} \quad T_{delay} = \min(\max(K_{min,pre} * N_{symb}, T_{delay,min}) + d0, T_{delay,max}) * S \quad \text{[Equation 3-2]}$$

$N_{symb}$ in Equations 3-1 and 3-2 above may be defined by the number of symbols for each slot (for example, $N_{symb}$=14). When the quantization in units of slots is considered, the terminal may apply the minimum offset from the PDSCH or PUSCH slot at a time point after the $T_{app}$ symbol. When quantization in units of slots is not considered, the terminal may apply the minimum offset from the next PDSCH or PUSCH symbol after a time point after $T_{app}$.

According to an embodiment of the disclosure, $T_{delay}$ having a symbol unit as described above may be applied by converting the symbol unit into an absolute time unit. When a value converted into the absolute time unit is $T_{proc}$, $T_{proc}$ may be defined as $T_{proc}=f(T_{delay})$, and, for example, may be defined as below.

$$T_{proc} = f(T_{delay}) = T_{delay} * (2048 + 144) * \kappa * S * T_C \quad \text{[Equation 3-3]}$$

$T_C = 1/(\Delta f_{max} \cdot N_f)$ where $\Delta f_{max} = 480 \cdot 10^3$ Hz and $N_f = 4096$.

$\kappa = T_S/T_C = 64$ where $T_s = 1/(\Delta f_{ref} \cdot N_{f,ref})$, $\Delta f_{ref} = 15 \cdot 10^3$ Hz and $N_{f,ref} = 2048$ $$T_{proc} = f(T_{delay}) = \min(\max(\kappa_{min,pre} * N_{symb}, T_{delay,min}) + d0, T_{delay,max}) * (2048 + 144) * \kappa * S * T_C \quad \text{[Equation 3-4]}$$

$$T_{proc} = f(T_{delay}) = \min((\max(K_{min,pre} * N_{symb}, T_{delay,min}) + d0 * (2048 + 144) * \kappa * S * T_C, T_{proc,max}),$$

where $T_{proc,max} = f(T_{delay,max}) = T_{delay,max} * (2048 + 144) * \kappa * S * T_C$ When the quantization in units of slots is considered, the terminal may apply the minimum offset from the next PDSCH or PUSCH slot at a time point after a $T_{proc}$ time interval from $T_0$ at which the minimum offset is received. When quantization in units of slots is not considered, the terminal may apply the minimum offset from a time point after a $T_{proc}$ time interval from $T_0$ at which the minimum offset is received.

The above-described detailed embodiments may be combined and managed.

Figure 8:
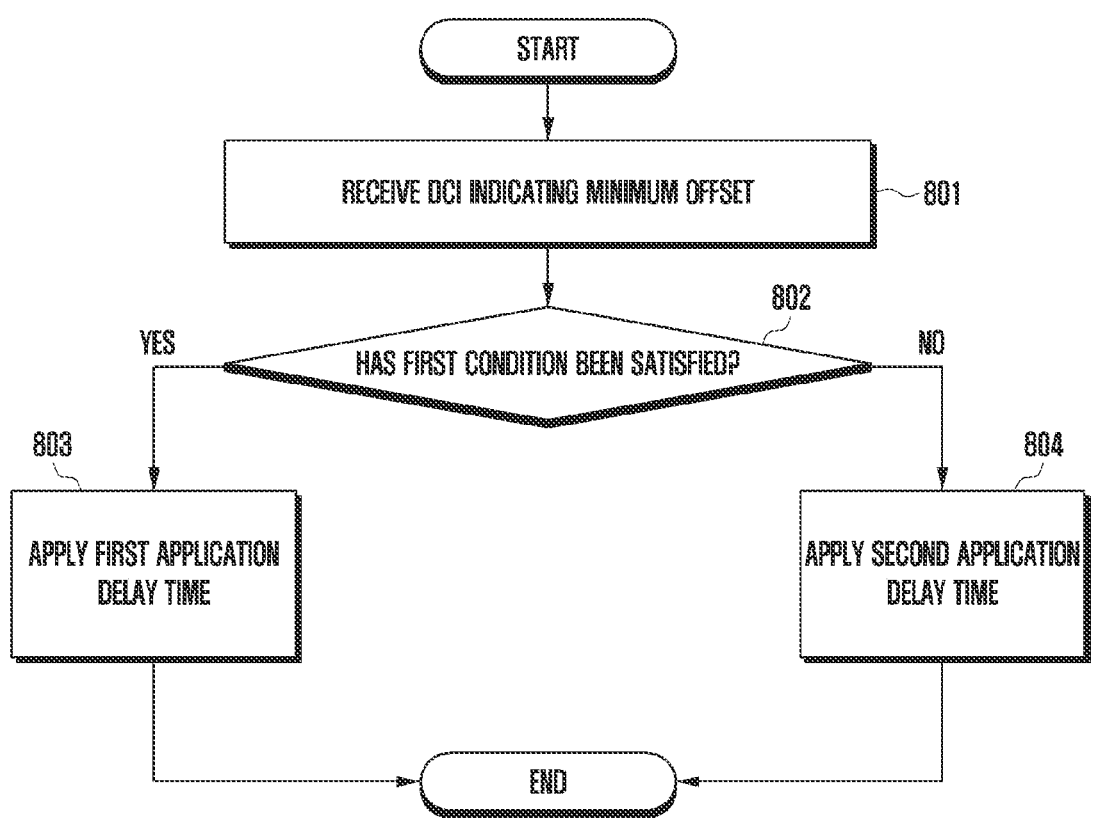
FIG. 8 illustrates an example of a terminal operation according to some embodiments of the disclosure.

FIG. 8 illustrates a terminal operation according to an embodiment of the disclosure.

According to an embodiment of the disclosure, an application delay time interval of the terminal may have a value which changes according to various system parameters. For example, when condition A is satisfied, the terminal may apply application delay time interval A, and another condition B is satisfied, the terminal may apply application delay time interval B. Various conditions and methods for determining the application delay time interval are described in the first embodiment of the disclosure in detail. In FIG. 8, in order to define a terminal operation by simplifying the above-described conditions and methods, a condition which affects the application delay time interval is normalized and considered as a "first condition". The terminal may apply a "first application delay time interval" or a "second application delay time interval" according to whether the "first condition" is satisfied.

More specifically, referring to FIG. 8, the terminal may receive DCI indicating the minimum offset in operation 801. The terminal may determine, in operation 802, whether the "first condition" for application delay time interval determination is satisfied. When the "first condition" is satisfied, the terminal may apply the received minimum offset value by applying the "first application delay time interval". When the "first condition" fails to be satisfied, the terminal may apply the received minimum offset value by applying the "second application delay time interval".

Figure 9:
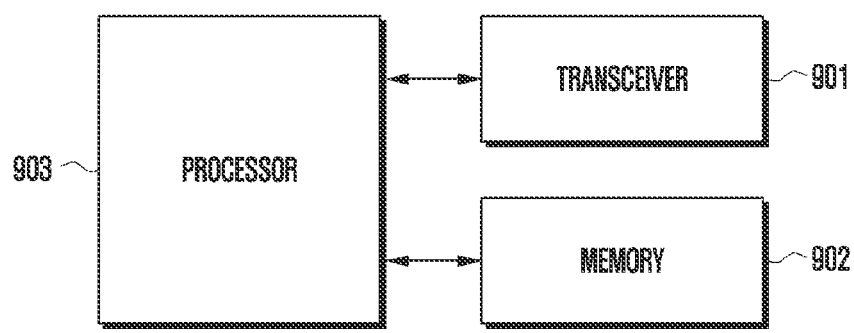
FIG. 9 is a block diagram illustrating a structure of a terminal according to an embodiment of the disclosure.
Figure 10:
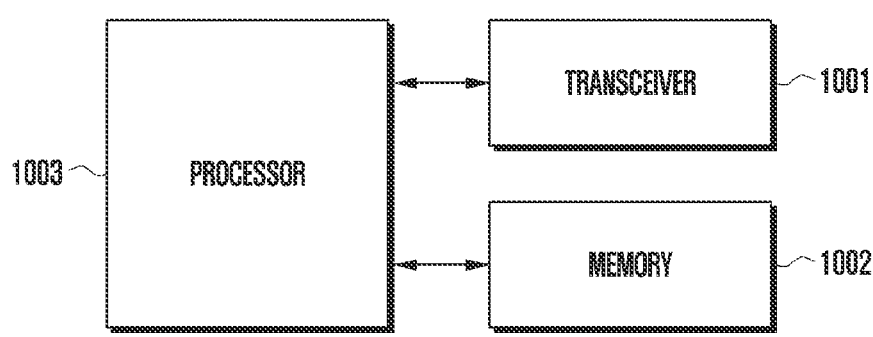
FIG. 10 is a block diagram illustrating a structure of a base station according to an embodiment of the disclosure.

FIG. 9 and FIG. 10 illustrate a transceiver, a memory, and a processor of the terminal and the base station, respectively, in order to perform the above-described embodiments. The above-described embodiments describe transmission or reception methods of the base station and the terminal for power consumption reduction of the terminal. In order to perform the method, a transceiver, a memory, and a processor of each of the terminal and the base station need to be operated according to the embodiments.

FIG. 9 is a block diagram illustrating a structure of a terminal according to an embodiment of the disclosure.

Referring to FIG. 9, the terminal may include a transceiver 901, a memory 902, and a processor 903. However, components of the terminal are not limited to the above-described example. For example, the terminal may include more or fewer components than the above-described components. In addition, the transceiver 901, the memory 902, and the processor 903 may be implemented as a single chip.

According to an embodiment of the disclosure, the transceiver 901 may transmit or receive a signal to or from a base station. The signal may include control information and data. To this end, the transceiver 901 may include an RF transmitter for up-converting and amplifying a frequency of a transmitted signal, and an RF receiver for low-noise amplifying a received signal and down-converting a frequency thereof. In addition, the transceiver 901 may receive a signal through a wireless channel, output the same to the processor 903, and transmit the signal output from the processor 903 through the wireless channel.

According to an embodiment of the disclosure, the memory 902 may store a program and data required for operations of the terminal. The memory 902 may store control information or data included in a signal transmitted or received by the terminal. The memory 902 may be a storage medium such as read-only memory (ROM), random access memory (RAM), a hard disk, a CD-ROM, and a digital versatile disc (DVD), or a combination of storage media. In addition, the memory 902 may include multiple memories. According to an embodiment of the disclosure, the memory 902 may store a program for controlling and receiving an operation for reducing power consumption of the terminal.

According to an embodiment of the disclosure, the processor 903 may control a series of processes which can be operated by the terminal according to the above-described embodiments of the disclosure. For example, the processor 903 may control a power consumption reduction operation of the terminal according to embodiments of the disclosure.

Specifically, the processor 903 may receive configuration information relating to a PDCCH from a base station, monitor the PDCCH from the base station according to the configuration information relating to the PDCCH, the configuration information being received from the base station, and control each configuration of the terminal having an operation of applying control details relating to detection and reception of the PDCCH, upon the monitoring.

In addition, the processor 903 may include multiple processors, and perform a terminal power consumption reduction method according to embodiments of the disclosure by executing a program stored in the memory 902.

FIG. 10 is a block diagram illustrating a structure of a base station according to an embodiment of the disclosure.

Referring to FIG. 10, the base station may include a transceiver 1001, a memory 1002, and a processor 1003. However, components of the base station are not limited to the above-described example. For example, the base station may include more or fewer components than the above-described components. In addition, the transceiver 1001, the memory 1002, and the processor 1003 may be implemented as a single chip.

According to an embodiment of the disclosure, the transceiver 1001 may transmit or receive a signal to or from a terminal. The signal may include control information and data. To this end, the transceiver 1001 may include an RF transmitter for up-converting and amplifying a frequency of a transmitted signal, and an RF receiver for low-noise amplifying a received signal and down-converting a frequency thereof. In addition, the transceiver 1001 may receive a signal through a wireless channel, output the same to the processor 1003, and transmit the signal output from the processor 1003 through the wireless channel.

According to an embodiment of the disclosure, the memory 1002 may store a program and data required for operations of the base station. The memory 1002 may store control information or data included in a signal transmitted or received by the base station. The memory 1002 may be a storage medium such as read-only memory (ROM), random access memory (RAM), a hard disk, a CD-ROM, and a digital versatile disc (DVD), or a combination of storage media. In addition, the memory 1002 may include multiple memories. According to an embodiment of the disclosure, the memory 1002 may store a program for generating and transmitting, by the base station, control information for reducing power consumption of the terminal.

According to an embodiment of the disclosure, the processor 1003 may control a series of processes which can be operated by the base station according to the above-described embodiments of the disclosure. For example, the processor 1003 may control each configuration of the base station in order to generate and transmit control information for reducing power consumption of the terminal.

In addition, the processor 1003 may include multiple processors, and perform a method for generating control information and transmitting a downlink control channel for reducing power consumption of a terminal reduction according to embodiments of the disclosure by executing a program stored in the memory 1002.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be combined with parts of other embodiments to operate a base station and a terminal. Further, the embodiments of the disclosure may be applied to other communication systems and other variants based on the technical idea of the embodiments may be implemented, For example, the embodiments may be applied to LTE systems, 5G systems, NR systems, and the like.

The invention claimed is:

1. A method performed by a terminal in a communication system, the method comprising:
    receiving, from the base station, downlink control information (DCI) in slot n, wherein the DCI is a format 1_1 and includes information for a minimum offset; and
    applying the minimum offset in slot n+X,
    wherein the X is an application delay defined based on a subcarrier spacing of a physical downlink control channel (PDCCH), a subcarrier spacing of a physical downlink shared channel (PDSCH), and a parameter associated with the application delay,
    wherein the parameter is a first value in case that the DCI format 1_1 with the information for the minimum offset is contained within first N symbols of slot n,
    wherein the parameter is a second value in case that the DCI format 1 1 with the information for the minimum offset is received after the first N symbols of the slot n, and
    wherein the second value is greater than the first value by 1.

2. The method of claim 1, wherein N equals 3.

3. The method of claim 1, wherein the information for the minimum offset indicates a minimum applicable value for a physical downlink shared channel (PDSCH) scheduling offset K0 and a minimum applicable value for a physical uplink shared channel (PUSCH) scheduling offset K2.

4. A method performed by a base station in a communication system, the method comprising:
    transmitting, to the terminal, downlink control information (DCI) in slot n, wherein the DCI is a format 1_1 and includes information for a minimum offset; and
    applying the minimum offset in slot n+X,
    wherein the X is an application delay defined based on a subcarrier spacing of a physical downlink control channel (PDCCH), a subcarrier spacing of a physical downlink shared channel (PDSCH), and a parameter associated with the application delay,
    wherein the parameter is a first value in case that the DCI format 1_1 with the information for the minimum offset is contained within first N symbols of slot n,
    wherein the parameter is a second value in case that the DCI format 1_1 with the information for the minimum offset is transmitted after the first N symbols of the slot n, and
    wherein the second value is greater than the first value by 1.

5. The method of claim 4, wherein N equals 3.

6. The method of claim 4, wherein the information for the minimum offset indicates both a minimum applicable value for a physical downlink shared channel (PDSCH) scheduling offset K0 and a minimum applicable value for a physical uplink shared channel (PUSCH) scheduling offset K2.

7. A terminal in a communication system, the terminal comprising:
    a transceiver; and
    a controller configured to:
        receive, from the base station, downlink control information (DCI) in slot n, wherein the DCI is a format 1_1 and includes information for a minimum offset, and
        apply the minimum offset in slot n+X,
    wherein the X is an application delay defined based on a subcarrier spacing of a physical downlink control channel (PDCCH), a subcarrier spacing of a physical downlink shared channel (PDSCH), and a parameter associated with the application delay,
    wherein the parameter is a first value in case that the DCI format 1_1 with the information for the minimum offset is contained within first N symbols of slot n,
    wherein the parameter is a second value in case that the DCI format 1 1 with the information for the minimum offset is received after the first N symbols of the slot n, and
    wherein the second value is greater than the first value by 1.

8. A base station in a communication system, the base station comprising:
    a transceiver; and
    a controller configured to:
        transmit, to the terminal, downlink control information (DCI) in slot n, wherein the DCI is a format 1_1 and includes information for a minimum offset, and
        apply the minimum offset in slot n+X,
    wherein the X is an application delay defined based on a subcarrier spacing of a physical downlink control channel (PDCCH), a subcarrier spacing of a physical downlink shared channel (PDSCH), and a parameter associated with the application delay,
    wherein the parameter is a first value in case that the DCI format 1_1 with the information for the minimum offset is contained within first N symbols of slot n,
    wherein the parameter is a second value in case that the DCI format 1_1 with the information for the minimum offset is transmitted after the first N symbols of the slot n, and
    wherein the second value is greater than the first value by 1.

* * * * *